United States Patent
Slider et al.

(10) Patent No.: US 6,505,031 B1
(45) Date of Patent: Jan. 7, 2003

(54) SYSTEM AND METHOD FOR PROVIDING A VIRTUAL SCHOOL ENVIRONMENT

(76) Inventors: Robert Slider, 161 E. Lake Brantley Dr., Longwood, FL (US) 32779; Michelle L. Robinson, 161 E. Lake Brantley Dr., Longwood, FL (US) 32779

( * ) Notice: Subject to any disclaimer, the term of this patent is extended or adjusted under 35 U.S.C. 154(b) by 0 days.

(21) Appl. No.: 09/513,444

(22) Filed: Feb. 25, 2000

(51) Int. Cl.$^7$ ................................................ G09B 7/00
(52) U.S. Cl. ........................ 434/350; 434/118; 434/353; 434/362
(58) Field of Search ......................... 434/350, 322, 434/323, 118, 353, 362; 709/203

(56) References Cited

U.S. PATENT DOCUMENTS

| | | | |
|---|---|---|---|
| 5,294,229 A | * 3/1994 | Hartzell et al. | ......... 434/336 X |
| 5,310,349 A | 5/1994 | Daniels et al. | |
| 5,458,494 A | 10/1995 | Krohn et al. | |
| 5,727,950 A | 3/1998 | Cook et al. | |
| 5,864,869 A | 1/1999 | Doak et al. | |
| 5,907,831 A | * 5/1999 | Lotvin et al. | ............. 705/14 X |
| 5,909,589 A | * 6/1999 | Parker et al. | ............. 712/32 X |
| 5,947,747 A | * 9/1999 | Walker et al. | ........... 434/354 X |
| 5,974,446 A | 10/1999 | Sonnenreich et al. | |
| 5,978,648 A | * 11/1999 | George et al. | ........... 434/362 X |
| 6,024,577 A | 2/2000 | Wadahama et al. | |
| 6,029,043 A | 2/2000 | Ho et al. | |
| 6,064,856 A | * 5/2000 | Lee et al. | ............... 434/350 X |
| 6,075,968 A | 6/2000 | Morris et al. | |
| 6,108,687 A | * 8/2000 | Craig | ..................... 709/203 X |
| 6,112,049 A | * 8/2000 | Sonnenfeld | ............. 434/350 X |
| 6,146,148 A | * 11/2000 | Stuppy | ................... 434/118 X |
| 6,149,441 A | * 11/2000 | Pellegrino et al. | ...... 434/350 X |
| 6,162,060 A | * 12/2000 | Richard et al. | ......... 434/118 X |
| 6,164,974 A | * 12/2000 | Carlile et al. | ........... 434/322 X |
| 6,185,605 B1 | * 1/2001 | Kowaguchi | ............. 709/206 X |
| 6,195,117 B1 | * 1/2001 | Miyazaki | .................. 348/15 X |

\* cited by examiner

*Primary Examiner*—Joe H. Cheng
*Assistant Examiner*—Chanda Harris
(74) *Attorney, Agent, or Firm*—Kolisch Hartwell, P.C.

(57) ABSTRACT

A virtual school environment for allowing a plurality of teachers from a plurality of schools to communicate with their students or their students' parents over a computer network. The virtual school environment includes a plurality of web pages accessible via the computer network and linked in a hierarchical arrangement. Each of the plural web pages corresponds to one of the teachers. The virtual school environment also includes a computer server system connectable to the computer network and configured to access the plurality of web pages. The server system includes software executable by the server system to receive school assignments from one or more teachers via the computer network, and then add the received assignments to the teachers' corresponding web pages. Optionally, the server system may be configured to automatically transmit assignments to one or more parents via the computer network.

30 Claims, 18 Drawing Sheets

SYSTEM AND METHOD FOR PROVIDING A VIRTUAL SCHOOL ENVIRONMENT

FIELD OF THE INVENTION

The present invention relates generally to providing school-related information via a computer network, and more particularly to a virtual school environment to allow teachers to communicate more efficiently with students and parents.

BACKGROUND

There is little question that parents and other guardians of children have an essential role to play in their children's education. Activities such as Parent Teacher Association (P.T.A.) meetings and public school board meetings have traditionally been some of the most significant ways in which parents can interact with their children's teachers and participate in evaluating and developing their children's curriculum. Similarly, more individualized communications such as parent-teacher conferences and report cards, etc., have been important tools in enabling parents to monitor their children's performance.

However, as societal concerns over the quality of the educational system continue, many parents and other guardians of children are seeking new ways to become more closely involved with their children's education. A growing number of parents also face increasing demands on their time from careers, etc. As a result, they need more efficient ways in which to communicate with their children's teachers and play an active role in their children's education.

Many teachers, school administrators, and other educational professionals are also seeking new ways in which to keep parents informed of their student's progress, and to encourage parental involvement with the educational system. Additionally, most teachers constantly strive to expand the boundaries of their classes beyond the classroom and expose their students to new educational resources and activities.

SUMMARY OF THE INVENTION

The invention provides a virtual school environment for allowing a plurality of teachers from a plurality of schools to communicate with their students or their students' parents over a computer network. The virtual school environment includes a plurality of web pages accessible via the computer network and linked in a hierarchical arrangement. Each of the plural web pages corresponds to one of the teachers. The virus school environment also includes a computer server system connectable to the computer network and configured to access the plurality of web pages. The server system includes software executable by the server system to receive school assignments from one or more teachers via the computer network, and then add the received assignments to the teachers' corresponding web pages. The server system may also be configured to transmit a selected teacher's web page via the computer network in response to a request.

In some embodiments, the server system is configured to receive requests from parents to receive the assignments, and to automatically transmit new assignments to those parents via the computer network. Optionally, additional information may be provided on the teacher web pages including comments, grades, and links to educational resources. In another embodiment, the server system is configured to allow students who speak different languages to work together on a common assignment.

DETAILED DESCRIPTION

Figure 1:
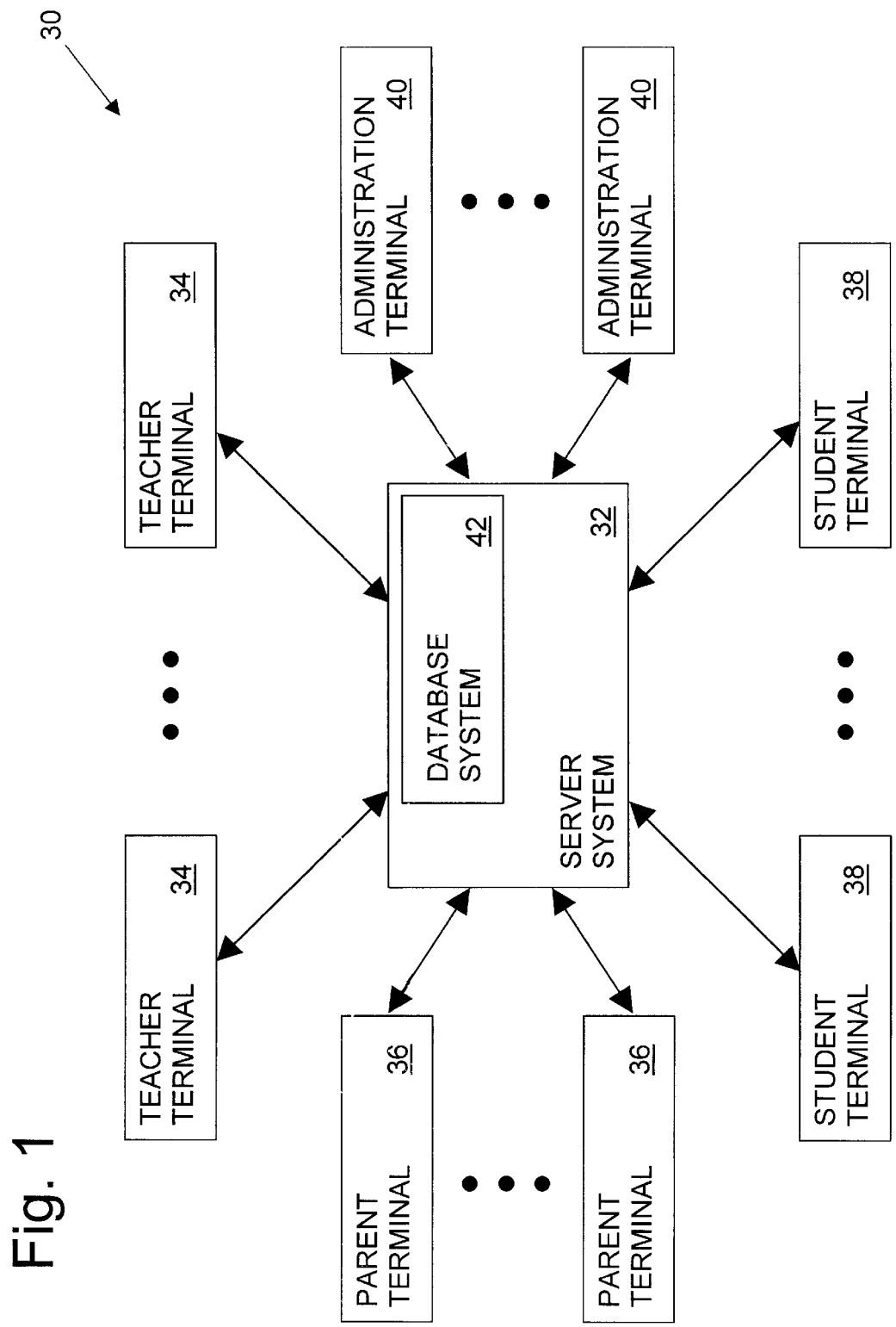
FIG. 1 is a schematic illustration of a virtual school environment according to the present invention.

A virtual school environment according to the present invention is indicated generally at 30 in FIG. 1. The virtual school environment includes a computer server system 32 connected to communicate over a computer network with one or more remote terminals. The remote terminals may include teacher terminals 34, parent terminals 36, student terminals 38, and administration terminals 40. Server system 32 is configured to access a plurality of teacher web pages stored on a database system 42. The web pages are linked in a hierarchical arrangement as described below. Server system 32 includes software executable by the server system to transmit a selected teacher web page via the computer network in response to a request from a remote terminal.

Server system 32 may be one of the wide variety of computer network servers well known to those of skill in the art, and may be implemented on a single computer system or distributed across a plurality of interconnected computer systems. Server system 32 may include one or more network security subsystems such as firewalls, etc., (not shown) to prevent unauthorized access and/or interference. Additionally, while database system 42 is illustrated as a single database system stored on server system 32, it will be appreciated that database system 42 may include multiple database systems stored on a single computer or on multiple interconnected computer systems. In any event, server system 32 is configured to access database system 42 to store, retrieve and modify the teacher web pages.

Remote terminals 34, 36, 38, and 40 may be any one or combination of personal computers, PDA's (personal digital assistants), set-top-boxes, cellular telephones, or other devices configured to communicate with a computer server over a computer network. Typically, server system 32 is connected to communicate with the remote terminals via the Internet. Alternatively, the server system and remote terminals may be connected by any one or more of a variety of public or private, general use or dedicated electronic communications networks, including intranets, extranets, etc. The physical connections between the server system and remote terminals may be any of the well known interconnection technologies such as modem, cable, DSL, Ethernet, fiber-optic, etc. The communications protocols between the server system and remote terminals may be standard TCP/IP protocol suites or any other suitable communication protocols for transferring data over a computer network.

Figure 2:
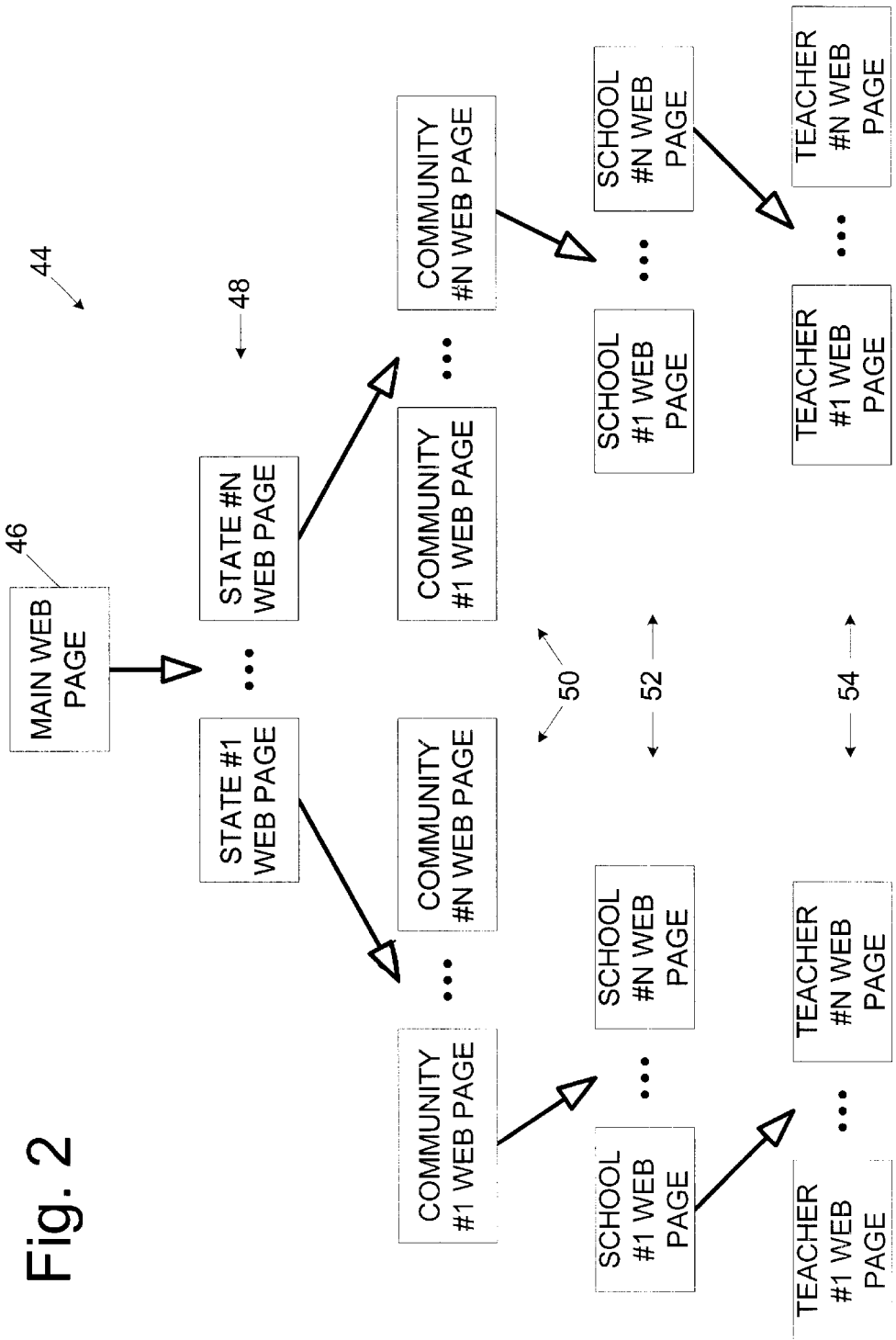
FIG. 2 is a schematic illustration of a hierarchical arrangement of web pages according to the present invention.

The teacher web pages may be hierarchically arranged in a variety of ways within the scope of the invention. FIG. 2 shows an exemplary arrangement 44 in which a main web page 46 includes links to a plurality of state web pages 48, each corresponding to a different state. Each of the state web pages 48 may include links to one or more community web pages 50 corresponding to one or more communities (e.g., cities, towns, school districts) within the state. Similarly, each community web page 50 may include links to one or more school web pages 52 corresponding to one or more schools within the community. Each school web page 52 may include links to one or more teacher web pages 54 corresponding to one or more teachers within the school. Thus, in the exemplary arrangement, the teacher web pages 54 are arranged in a hierarchical tree-structure according to the corresponding teacher's state, community, and school.

The exemplary hierarchical arrangement shown in FIG. 2 provides a nationwide viral school environment encompassing schools from many communities in many states. Teachers, parents, students, administrators, etc., are thereby able to communicate and share information and ideas even though they are distributed across the nation. The arrangement allows users to evaluate and compare educational trends, initiatives, curricula, etc., among schools, communities and states. It will be appreciated, however, that the web pages may alternatively be linked in other hierarchical arrangements as desired depending on the needs and preferences of the users. The web pages may also be linked in a plurality of hierarchical arrangements to suit the needs of different users.

The hierarchical arrangement of the web pages allows users to access a teacher's web page without pre-knowledge of the particular network address and path of the web page. A parent, teacher, or other user can locate the web page corresponding to a particular teacher by operating a remote terminal to link from main web page 46 to a selected teacher web page 54. From the main web page the user operates the remote terminal to select the link of the desired state web page 48. Each time the user operates the remote terminal to select a link, the remote terminal transmits a request to server system 32 for the web page corresponding to the selected link. The server system responds to the request by transmitting the requested web page to the remote terminal for display to the user.

From the selected state web page, the user operates the remote terminal to select the link of the desired community web page 50. From the selected community web page, the user operates the remote terminal to select the link of the desired school web page 52. The school web page will display links to one or more teacher web pages 54 corresponding to the school's teachers. It will be understood that since many teachers teach more than one class of students, some teachers may have multiple web pages, each corresponding to a different class. Alternatively, a single teacher's web page may correspond to more than one class taught by the teacher. It will also be understood that as used herein, the term teacher may include principals, counselors, assistants, etc.

The web pages may be in any suitable format compatible with the server system and remote terminals such as text, HTML (hypertext markup language), images, etc. The content of the web pages may be selected and arranged as desired by the system operator and/or the schools or teachers. For example, some school web pages may include links to web pages corresponding to student organizations, extracurricular activities, etc., as well as links to the teacher web pages. In any event, the web pages are stored on database system 42 in a suitable database structure.

Figure 3:
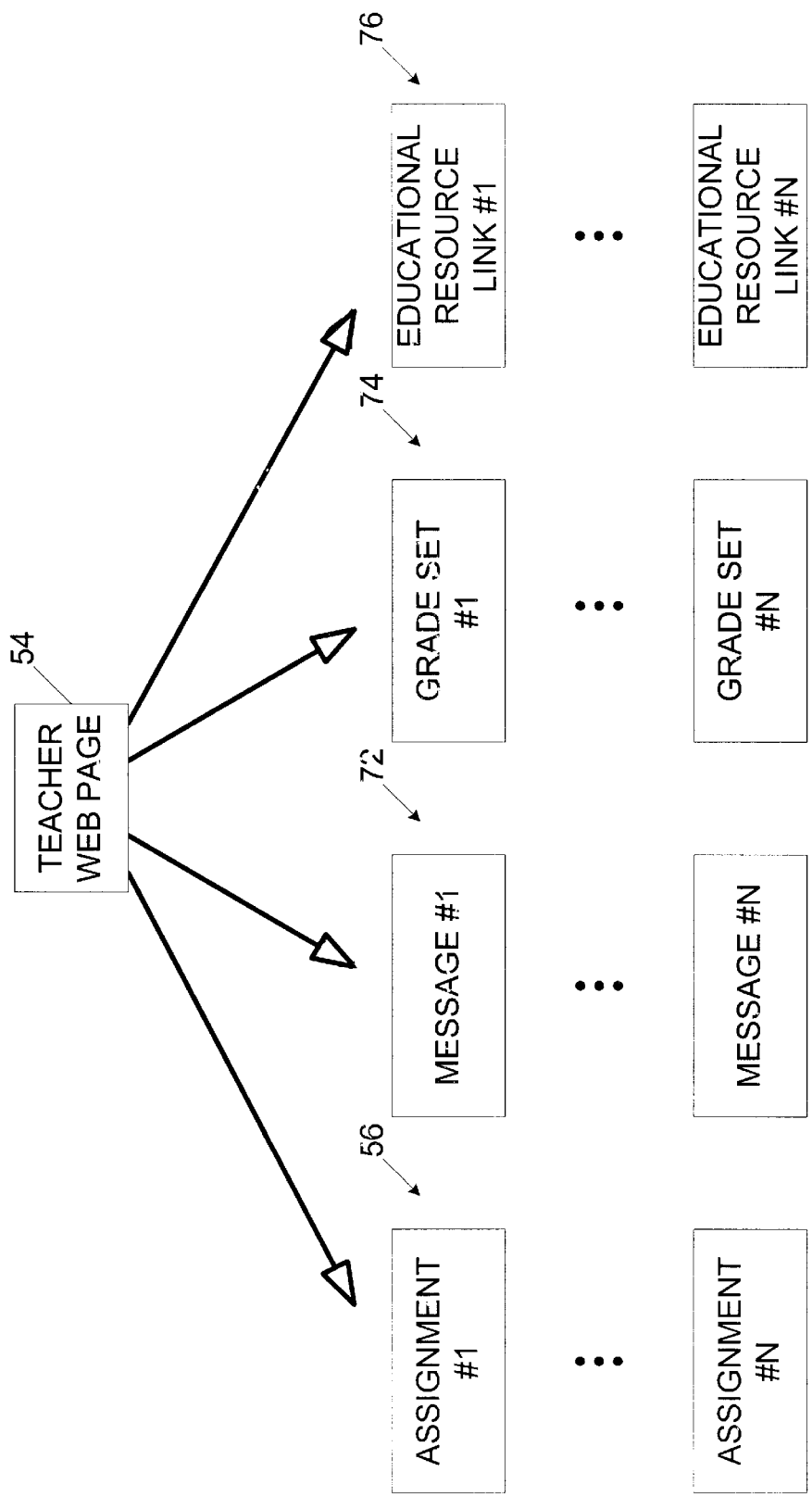
FIG. 3 is a schematic illustration of the links on a teacher's web page according to the present invention.

Turning now to FIG. 3, a schematic illustration of an exemplary teacher web page 54 is shown. Teacher web page 54 includes one or more assignments. The assignments may be included on the teacher web page directly, or via a link to one or more web pages 56, each of which includes one or more assignments. Where the teacher web page corresponds to a single class of students taught by the teacher, the assignments represent tasks, exercises, problems, etc., which the teacher has assigned to a particular class of students. Where the teacher web page corresponds to multiple classes taught by the teacher, each assignment may be assigned to a particular one of the multiple classes. Additionally, the multiple assignments may be categorized according to the classes to which the assignments were assigned. In the latter case, the teacher web page may include links to class web pages (not shown) which include the corresponding assignments or links to the assignment web pages 56. Alternatively, one or more assignments may be assigned to some or all of the classes taught by the teacher. As a further alternative, one or more assignments may be assigned to particular students or groups of students within a class.

The assignments typically are developed by the corresponding teacher. Once the teacher has developed the assignment, the teacher may operate remote terminal 34 to transmit the assignment to the server system. The server system software is configured to receive the assignment, determine which student or class it is assigned to, and store it on database system 42. The server system software also is configured to add the assignment to the corresponding teacher's web page. If the teacher's web page includes links to assignment web pages rather than the assignments, then the server system adds the assignment by storing the assignment in the form of an assignment web page, and adding a link to the assignment web page on the teacher's web page. In any event, once the assignments have been added to the teacher's web page, the assignments may be accessed by parents, students, etc.

In addition to adding new assignments, teachers may also modify or delete assignments which are accessible on their web pages. The server software is configured to receive instructions from a teacher to modify or delete a particular assignment and, in response to those instructions, the server system either modifies or deletes the assignment stored on database system 42 as required. Alternatively, a teacher may instruct the server system to remove the assignment from a particular web page without deleting it from the database system. In the latter case, the assignment is saved or "archived" on the database system and therefore available for addition to a web page at a later time. For example, a teacher may place assignments on his or her web page for Fall semester and then replace the assignments with new assignments for the Spring semester. However, the Fall semester assignments remain on the database system for addition to the web page for the following Fall semester.

One situation in which a teacher might wish to modify an assignment is to assign the assignment to a different class. In response, server system 32 would add the assignment to the web page corresponding to the different class. Another situation in which a teacher might wish to modify an assignment is to provide additional information after an assignment has been completed. For example, the assignment may initially be added to the web page with a "due date" when the assignment must be completed. Once the due date has passed, the teacher can modify the assignment to include the solutions to problems, average scores, recommended reading, extra credit assignments, etc. It will be appreciated that the above examples are just a few of the many possible ways that teachers can use the assignment pages to direct their students' studies.

It may be desirable for the server system software to include the necessary security features to ensure that only the teacher can modify his or her own web page. For example, the server system may require the teacher to provide a confidential, unique password to make changes to the web page. A list of all teacher passwords is stored on database system 42 and accessible by server system 32. Other security features may also be used, either alone, or in combination with the password system.

As mentioned above, once the server system adds a new or modified assignment to a teacher's web page, the assignment may be viewed by students, parents, fellow teachers, and other users of remote terminals via the Internet. The virtual school environment allows a teacher to make an assignment available to a large number of people without having to convey the assignment to each person individually. One significant advantage of environment 30 is that users can receive the assignment virtually instantaneously without having to be present at the school. For example, a student who is absent from school due to illness, family emergency, field trips, etc., can still receive the assignment by operating remote terminal 38 to request the assignment from server system 32. Similarly, a teacher who is absent from school may also provide an assignment to his or her class by adding it to the corresponding web page. As another example, a student who accidentally loses or forgets an assignment can recover it from the teacher's web page. Thus, the virtual school environment ensures that students need never miss an assignment so long as they have access to a remote terminal connectable to server system 32.

While some users may wish to review particular assignments on an occasional basis, others may wish to receive every new or modified assignment when it is added to the teacher's web page. For example, since parents typically are not present in the classroom, they usually will not know when an assignment has been assigned to their student. Therefore, some parents may wish to receive the assignments automatically when they are assigned. To meet this need, one embodiment of the invention includes a server system 32 configured to automatically transmit an assignment to one or more parents when the assignment is added to a teacher's web page.

Figure 4:
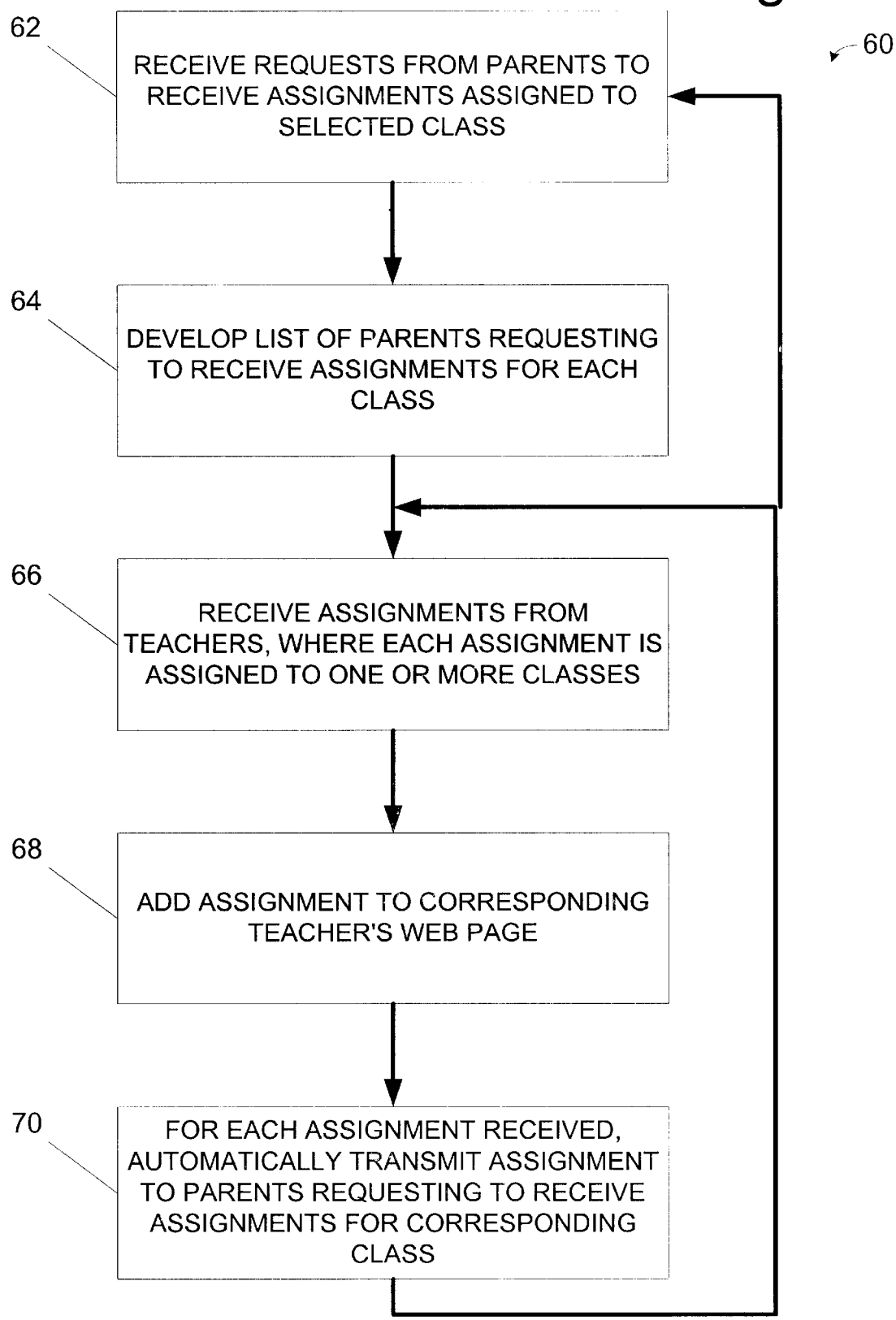
FIG. 4. is a flow chart illustrating a method of automatically transmitting assignments to parents over a computer network according to the present invention.

It will be appreciated that there are many ways within the scope of the invention by which server system 32 may be configured to automatically send assignments to selected users such as parents. For example, the server system may automatically send all assignments to all parents, who then discard any assignments which are not assigned to their children. As another example, a teacher may designate selected parents to receive the assignments and the server system would automatically send the assignment only to those selected parents. Alternatively, the server system may be configured to determine which parents wish to automatically receive assignments, and to automatically transmit assignments only to those parents. One exemplary method for implementing this latter system on server system 32 is indicated generally at 60 in FIG. 4.

As indicated at step 62, the server system software is configured to receive requests from parents who wish to automatically receive assignments which have been assigned to their students or their student's class(es). The server system may receive the requests via the computer network or by other means. Based on the requests received, the server system then develops a list of those parents requesting to receive assignments assigned to each class, as indicated at step 64. The lists are stored on database system 42. It will be appreciated that each parent may be on more than one list, for example, when the parent has more than one child in school, or the parent's child attends more than one class. Additionally, other users such as students, etc., may also wish to be added to the list of automatic recipients.

The server system may also be configured to receive requests to be removed from a list from parents who no longer wish to receive assignments. In this case, the server system is configured to remove the parent from the designated list to ensure that assignments are no longer automatically transmitted to the parent. Thus, the lists of parents and other users requesting to receive assignments is a dynamic list that is updated repeatedly.

The server system is also configured to receive assignments from multiple teachers as described above and indicated at step 66. Each assignment may be assigned to one or more students or classes. Server system 32 stores the assignment on database system 42. At step 68, the server system adds the assignment to the corresponding teacher's web page. Additionally, at step 70, the server system automatically transmits the assignment to those parents who requested to receive assignments for the corresponding class. The server system determines which parents should receive the assignment by accessing the database system to read the corresponding list of parents developed at step 64. The server system is then ready to receive requests from additional parents, or receive additional assignments.

The assignments may be automatically transmitted to the parents via the computer network or any other known means of communication. In the exemplary embodiment, the assignments are automatically transmitted to the parents via the computer network by electronic mail (e-mail). This ensures that the parents receive the assignments at approximately the same time the assignments are added to the teacher's web page. Alternatively, the assignments may be sent to the parents before or after being added to the web page. The list of parents on database system 42 who have requested to receive assignments may include the parents' e-mail addresses to allow the server system to direct the assignments to the appropriate user.

In addition to automatically transmitting new assignments, the server system may also be configured to automatically transmit modified assignments to those users requesting to receive assignments for the corresponding class. For example, if the server system receives a command from a teacher to reassign an existing assignment from a first class to a second class, the server system may be configured to: 1. remove the assignment from the web page corresponding to the first class; 2. add the existing assignment to the web page corresponding to the second class; and 3. automatically transmit the assignment to the users requesting to receive assignments for the second class. It will be appreciated that the steps described above may be executed simultaneously or sequentially in any order, and may be in response to a single command from the teacher or multiple commands.

Turning attention back to FIG. 3, it can be seen that teacher web pages 54 may include other items in addition to assignments 56. For example, in the depicted embodiment, the teacher web page includes one or more messages, grade sets, and educational resource links.

The messages may be any type of message or information that a teacher wishes to communicate to students or parents, etc., without designating the message as an assignment. Exemplary messages include solutions to assignments, notices of test dates, suggested reading lists, extra credit projects, information for parents, class schedules, motivational quotations, holiday reminders, etc. The messages may be added directly to the teacher's web page or may be added as links to one or more message web pages 72. Similar to the assignments described above, the messages may be added, deleted and modified by the corresponding teacher and stored or archived on database 42. The server system may include security features to ensure that only the teacher can add, delete or modify messages. Alternatively, the server system may be configured to allow others to add or modify the messages. In addition, the server system may be configured to automatically transmit the messages to parents, students, etc., as described above in connection with the assignments.

The grade sets may include student grades for particular assignments or tests, grades for a particular time period (e.g., semester), or overall grades for the course. Each set may include grades for a single student or multiple students. In the latter case, the grades may be associated with anonymous identifiers assigned to each student rather than student names, etc., to ensure that each student's grades remain confidential. In addition to individual grades for each student, the grade sets may include average grades, for example from standardized tests, for groups of students or all students. As with the assignments and messages, the grade sets may be added directly to teacher web page 54, or they may be added to grade set web pages 74 which are accessible through links on the teacher web page.

Figure 5:
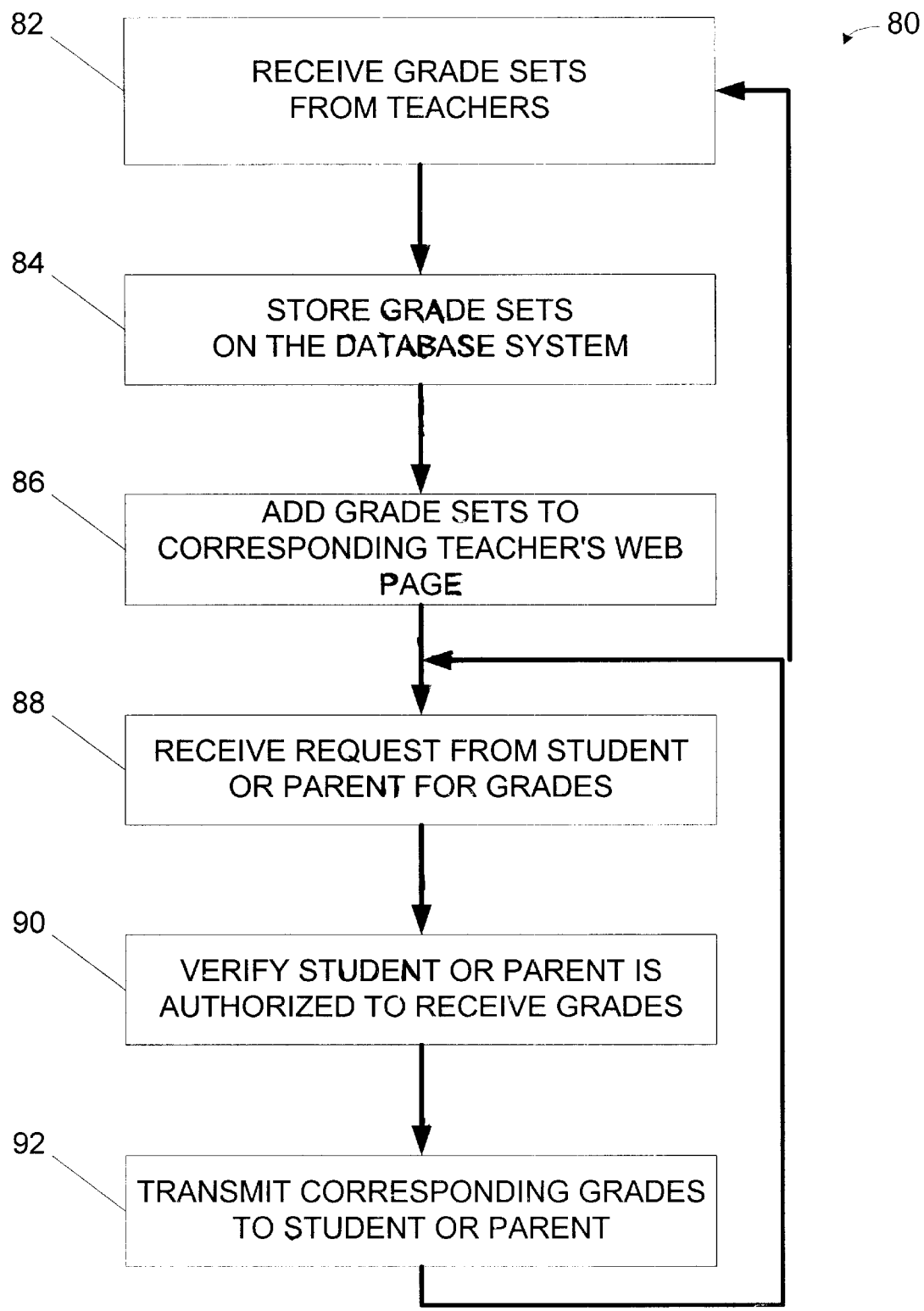
FIG. 5 is a flow chart illustrating a method of providing student grades over a computer network according to the present invention.

It will be appreciated that there are many ways in which to implement the receipt and distribution of grade sets within the scope of the invention. One exemplary implementation is indicated generally at 80 in FIG. 5. The student grades are received by server system 32 from teachers via the computer network, as indicated at step 82. Each grade set is associated with a particular student, group of students, or class. The grade sets are stored, at step 84, on system database 42 and protected from modification by anyone other than the corresponding teacher. Typically, teachers must enter authorized passwords to add or modify their grade sets. The grade sets are also added to the corresponding teacher's web page, as indicated at step 86.

If the grade sets are available for the general public, then any user may access the grades through the corresponding teacher web page by operating a remote terminal to send a request to server system 32. Typically, the grade sets which are available to the public will not include student identifying information. Alternatively, the grades may be associated with anonymous identifiers which are assigned to each student, thereby allowing the student to determine his or her grade confidentially. In any event, the server system is configured to receive requests for the grades via the computer network, as indicated at step 88, and then transmit the corresponding grades, as indicated at step 92.

If the grade sets are not available to the general public, then server system 32 is configured to verify, at step 90, that the request for a particular grade set is from a parent or student, etc., who is authorized to receive the grades. For example, the server system may request the user's confidential password to verify that the user is authorized. A list of passwords for authorized users may be stored on database system 42. Typically, each user will be authorized to receive only particular designated grades. For example, a student or the student's parents may be authorized to receive only the grades of the student or the student's class. Alternatively, the user may be authorized to receive all grade sets stored on database system 42. If the user does not provide an authorized password, the server system is configured to deny the user's request for the grade set.

In addition to, or instead of, adding the grade sets to the corresponding teacher's web page, the server system may be configured to automatically transmit the grade sets to designated users via the computer network. Similar to the automatic transmission of assignments described above, the server system may be configured to develop lists of parents or students requesting to receive a particular grade set, and store the lists on database system 42. If desired, the server system may require the user to provide an authorized password to be placed on a list. Subsequently, when a teacher adds or modifies a grade set, the server system accesses the lists and automatically sends the grade sets to those users who requested them. The lists may be transmitted by e-mail or any other suitable means of communication.

The educational resource links may be links to any type of resource that is available via the computer network and that the teacher wants to make available to students and parents. Just a few examples include links to news sources, libraries, encyclopedias, maps, databases, scientific institutions, government agencies, museums, cultural associations, etc. These resources are added to a teacher's web page as links which the user can select to access the resource web pages 76. The resource web pages may be administered by server system 32 or other server systems connected to the computer network. Typically, server system 32 includes security features such as those described above to ensure that only the teacher may add or remove links to his or her web page.

While an exemplary embodiment of teacher web pages 54 has been described above as including student assignments, messages, grade sets, and educational resource links, it will be appreciated that any type of communication or resource may be included on the teacher web pages within the scope of the invention. Additionally, while the teacher web pages have been described as a single web page having selected information and resource and/or links to selected information and resources, the teacher web pages may alternatively include multiple web pages linked together in any desired arrangement In addition to providing a means for teachers to communicate with their students and the students' parents, one embodiment of virtual school environment 30 also includes a multi-lingual capability to allow teachers and other users to communicate across language barriers. Server system 32 may be configured to provide the translation, or alternatively, the translation may be provided by a separate server system which is connected to the computer network and accessible via server system 32. One suitable source for translation is provided via the Internet by GO NETWORK at the Internet address "http://translator.go.com." In either case, environment 30 provides translation of communications between various users as well as the information on teacher web pages 54.

Figure 6:
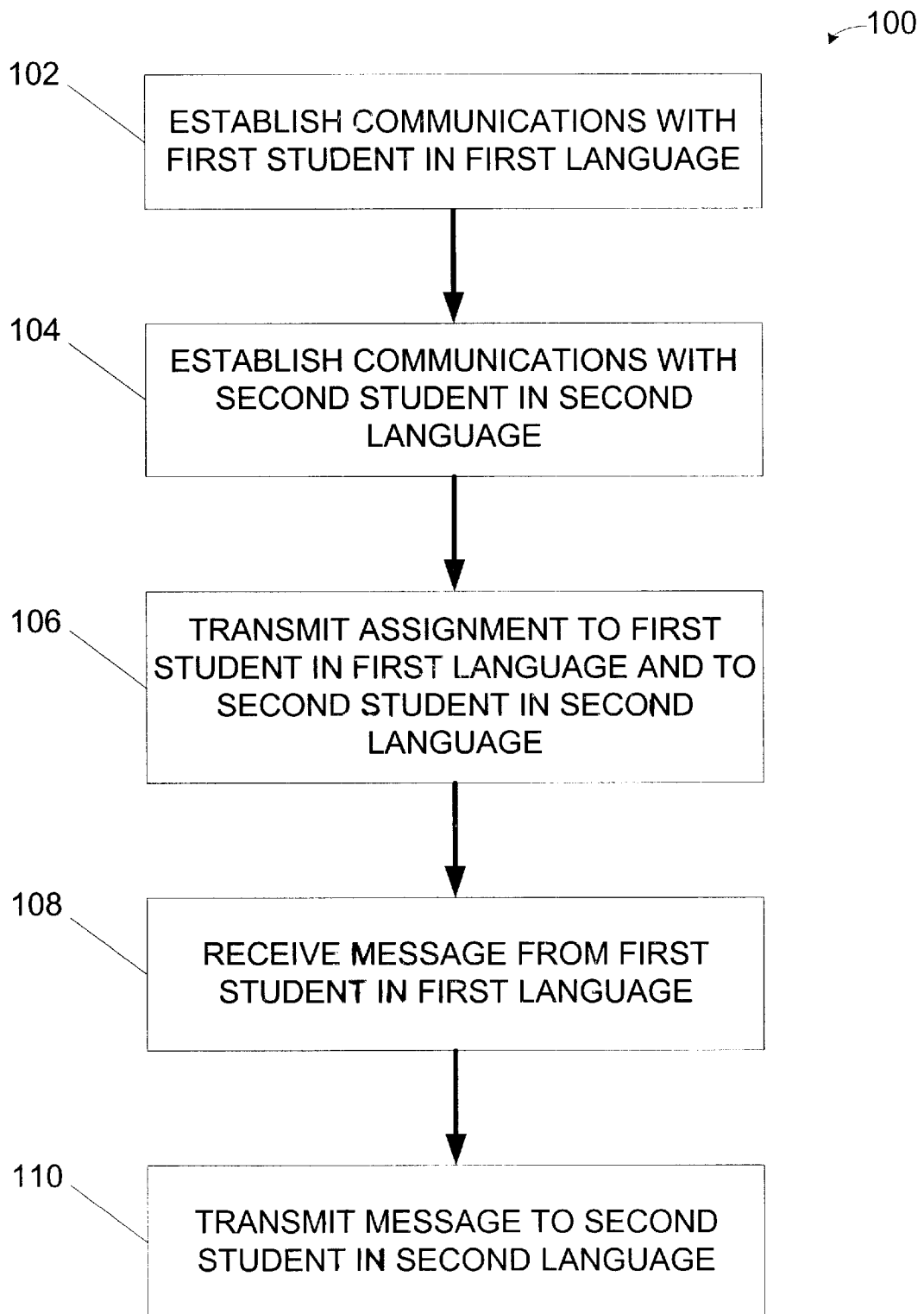
FIG. 6. is a flow chart illustrating a method according to the present invention for allowing students who speak different languages to work together on a common assignment.

FIG. 6 illustrates one exemplary application of the translation feature of environment 30, which includes a method 100 to allow students who speak different languages to work together on a common assignment. The method includes establishing communications with a first student in a first language, at step 102, and establishing communications with a second student in a second language different than the first language, at step 104. Communications may be established when the students operate remote terminals 38 to access a teacher's web page. Either one or both the first and second student will access the web page through the translation function so that communications are carried out in the appropriate language. Typically, server system 32 provides a link or student-selectable command to activate the translation function. Subsequently, each student can request the assignment by accessing the corresponding teacher's web page and, if necessary, the corresponding assignment page. The assignment is then transmitted to the first student in the first language and to the second student in the second language, as indicated at step 106. It will be understood that if the assignment is stored in either the first or second languages, then the first or second student, respectively, will not need to activate the translation function. Alternatively, the assignment may be received and stored in a third language different from the first and second languages. In this latter case, both the first and second students may activate the translation function to read the assignment.

Virtual school environment 30 also allows the first and second students to communicate in their own languages. As indicated at step 108, method 100 also includes receiving a message (e.g., an e-mail message) from the first student in the first language. The message is then translated into the second language and transmitted to the second student, as indicated at step 10. The method also includes receiving a message from the second student in the second language, and then transmitting the message to the first student in the first language. Thus, teachers can expand the boundaries of their classrooms and allow their students to learn by working together with students from different countries and cultures to complete a common assignment. Additionally, students who speak one language can communicate with teachers who speak a different language. Similarly, parents who do not speak the language used in their child's classroom can still communicate with their child's teachers and monitor their child's progress. It will be appreciated that the other information on a teacher's web page including comments, grade sets, etc., may also be translated.

As described above, virtual school environment 30 provides new ways for teachers to communicate with their students and the students' parents. Environment 30 also provides new ways for parents to participate in their children's education and monitor their children's schoolwork. In addition, environment 30 allows teachers, principals, and other educational policy makers to share information efficiently and evaluate and compare the curricula and student performance in schools throughout the country or the world. Those of skill in the art will appreciate that virtual school environment 30 may be implemented in any of a wide variety of configurations within the scope of the invention depending on the needs and preferences of the users. Therefore, while one particular implementation is described below, it will be understood that the invention is not limited to any particular implementation.

In an exemplary embodiment of environment 30, server system 32 includes an Internet web server as is known in the art and includes software executable by the server system to communicate with remote terminals 34, 36, 38, and 40 as well as to access a database system 42, which is available from the Oracle Corporation of Redwood Shores, Calif. and others. The software may be any suitable programming language including, for example, the Perl programming language. The remote terminals include a variety of computer devices including personal computers, PDA's, set-top-boxes, etc., configured to run known Internet browsing software. The server system is configured to communicate with the remote terminals by transmitting information via the Internet in the form of web pages in response to requests from the remote terminals. The information received by server system 32 from teachers, etc., for storage on database system 42, may be in any suitable format, including CSV (comma-separated values) files.

Figure 7:
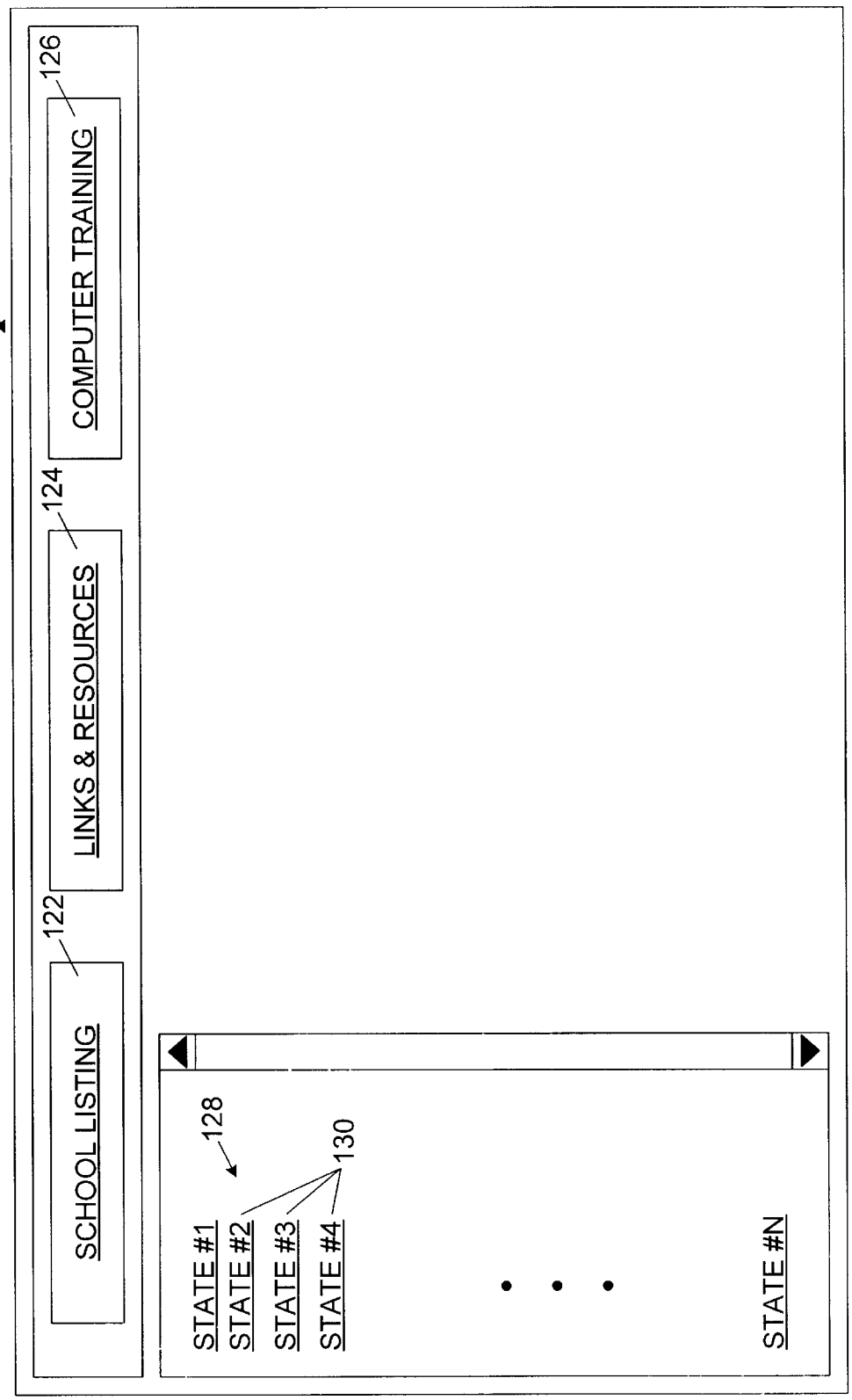
FIG. 7 illustrates an exemplary main web page according to the present invention.

The server system software is configured to provide user interfaces with which teachers, parents, students, etc., can interact with the virtual school environment. The interfaces for different users are similar within some regions of environment 30, but different in other regions of the environment. An initial entry point into the environment, which is common to all user interfaces, is shown in FIG. 7. In response to an access request from a remote terminal, server system 32 transmits a user interface web page 120 for display on the user terminal. The user interface web page typically corresponds to main web page 34 shown in FIG. 2. Web page 120 provides a plurality of user-selectable links or commands including a "School Listing" link 122, a "Links & References" link 124, and a "Online Courses" link 126. It will be noted that links 122, 124 and 126 are shown in underline format in FIG. 7 to indicate that the elements are user-selectable links (e.g., hypertext links) rather than simply textual elements. This convention will be followed throughout the remaining figures.

Figure 8:
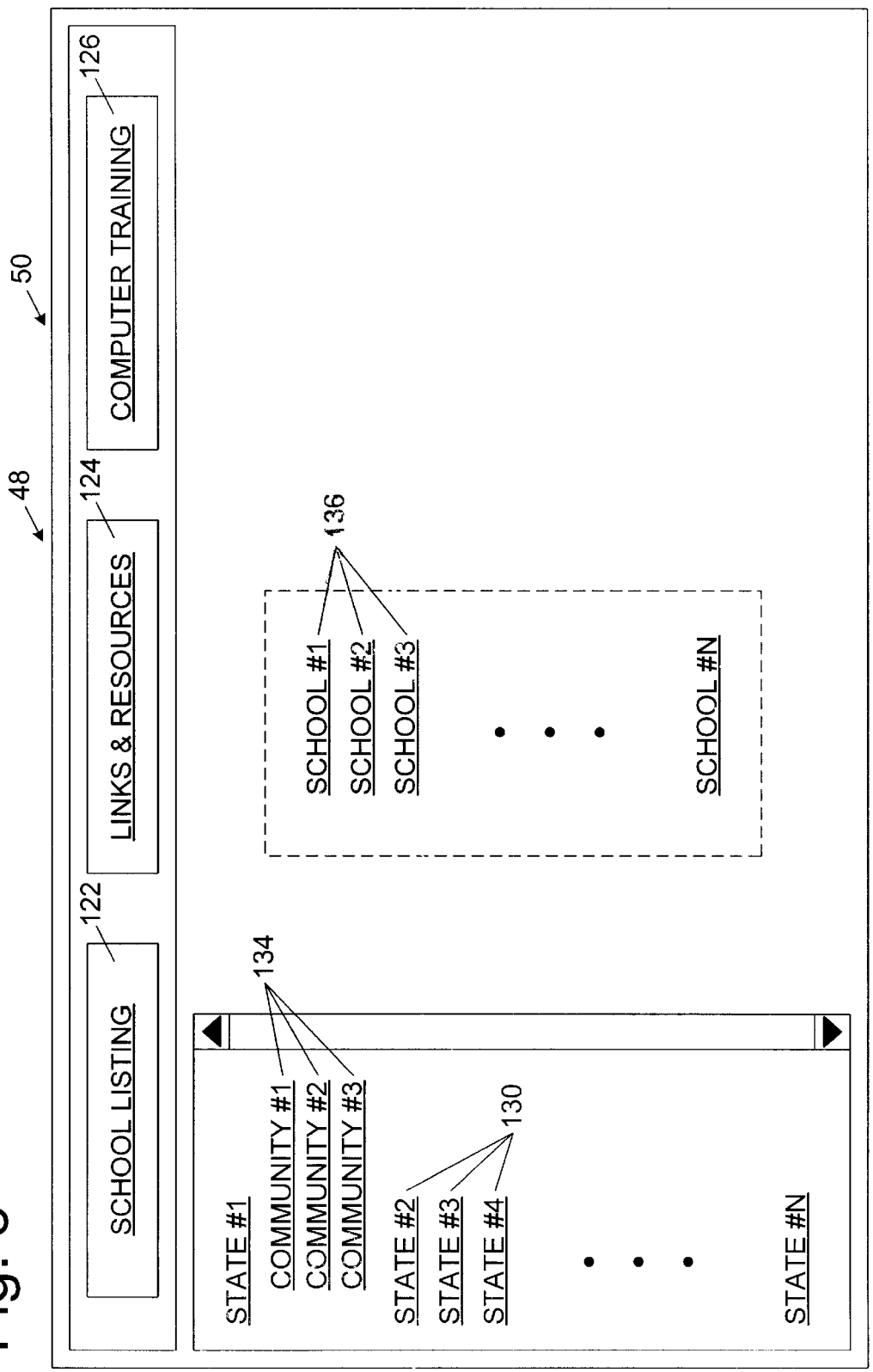
FIG. 8 illustrates both an exemplary state web page and an exemplary community web page according to the present invention, where the elements in the dashed-line box only appear in the exemplary community web page.
Figure 9:
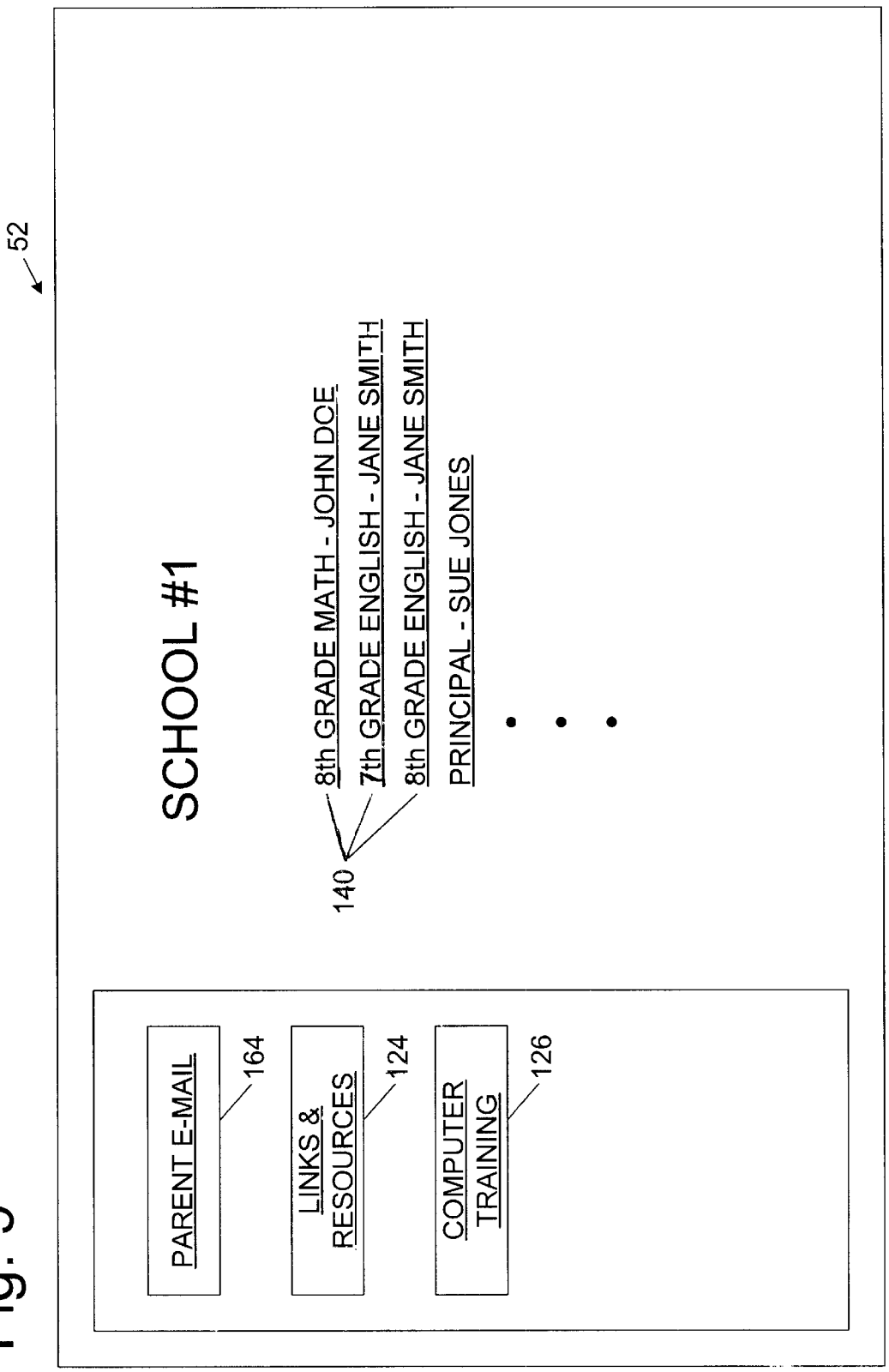
FIG. 9 illustrates an exemplary school web page according to the present invention.

To navigate to a particular teacher's web page, a user first requests a list of available state web pages by selecting the school listing link 122, which causes the server system to display a list 128 of state links 130 on web page 120. A user then requests a particular state web page by selecting the corresponding state link 130. This causes the server system to transmit the selected state web page 48, as shown in FIG. 8. The state web page includes a list of community links 134, corresponding to the available communities within the selected state. Next, a user selects a community link 134 to request the corresponding community web page 50 from server system 32. The community web page is similar to the state web page, but also includes a list of school links 136. When a user selects one of the school links, the server system responds by transmitting the corresponding school web page 52, an example of which is shown in FIG. 9. School web page 52 typically includes a list of links 140 to available teacher web pages. Thus, the user interface provided by virtual school environment 30 allows a user to navigate quickly and easily to any selected teacher's web page by browsing through the hierarchically arranged web pages as described above.

Figure 10:
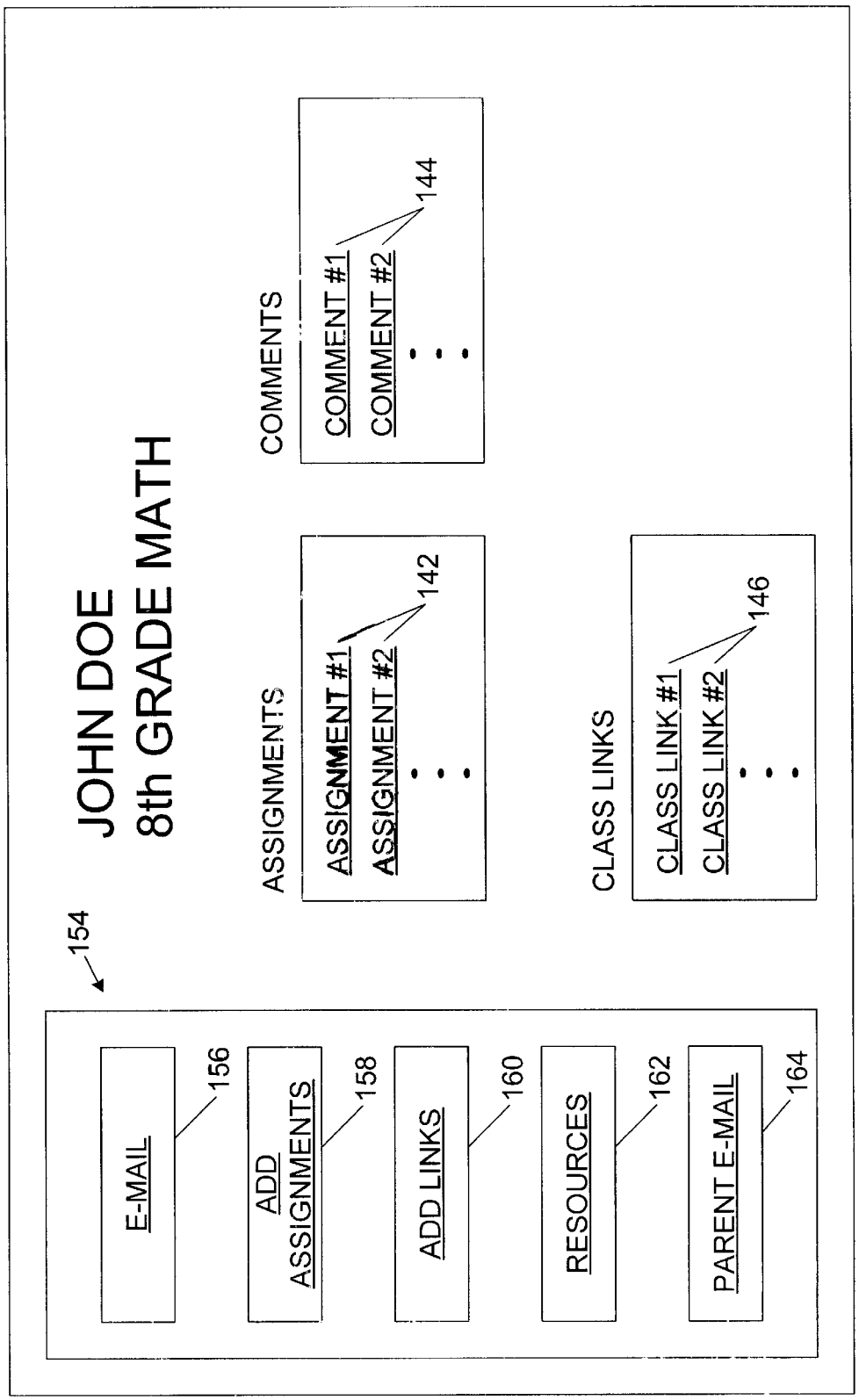
FIG. 10 illustrates an exemplary teacher web page according to the present invention.

When a user requests a particular teacher's web page by selecting the corresponding teacher web page link 140, server system 32 responds by transmitting the teacher web page for display on the user's remote terminal. An exemplary teacher web page 54 is shown in FIG. 10. Teacher web page 54 includes one or more assignment links 142 corresponding to one or more assignment web pages, which will be described in more detail below.

Teacher web page 54 may also include one or more message or comment links 144, and one or more educational resource or class links 146. Comment links 144 correspond to comment or message web pages containing any communications other than assignments the teacher wishes to make to students or parents. Class links 146 correspond to other educational resources that the teacher wishes to make available to students. As described above, these educational resource links typically correspond to Internet sites and resources provided by entities outside the school such as search engines, on-line museums, government agencies, etc. The class links may be used like a supplemental library or class textbook where the teacher develops assignments based on information available through the class links.

Figure 11:
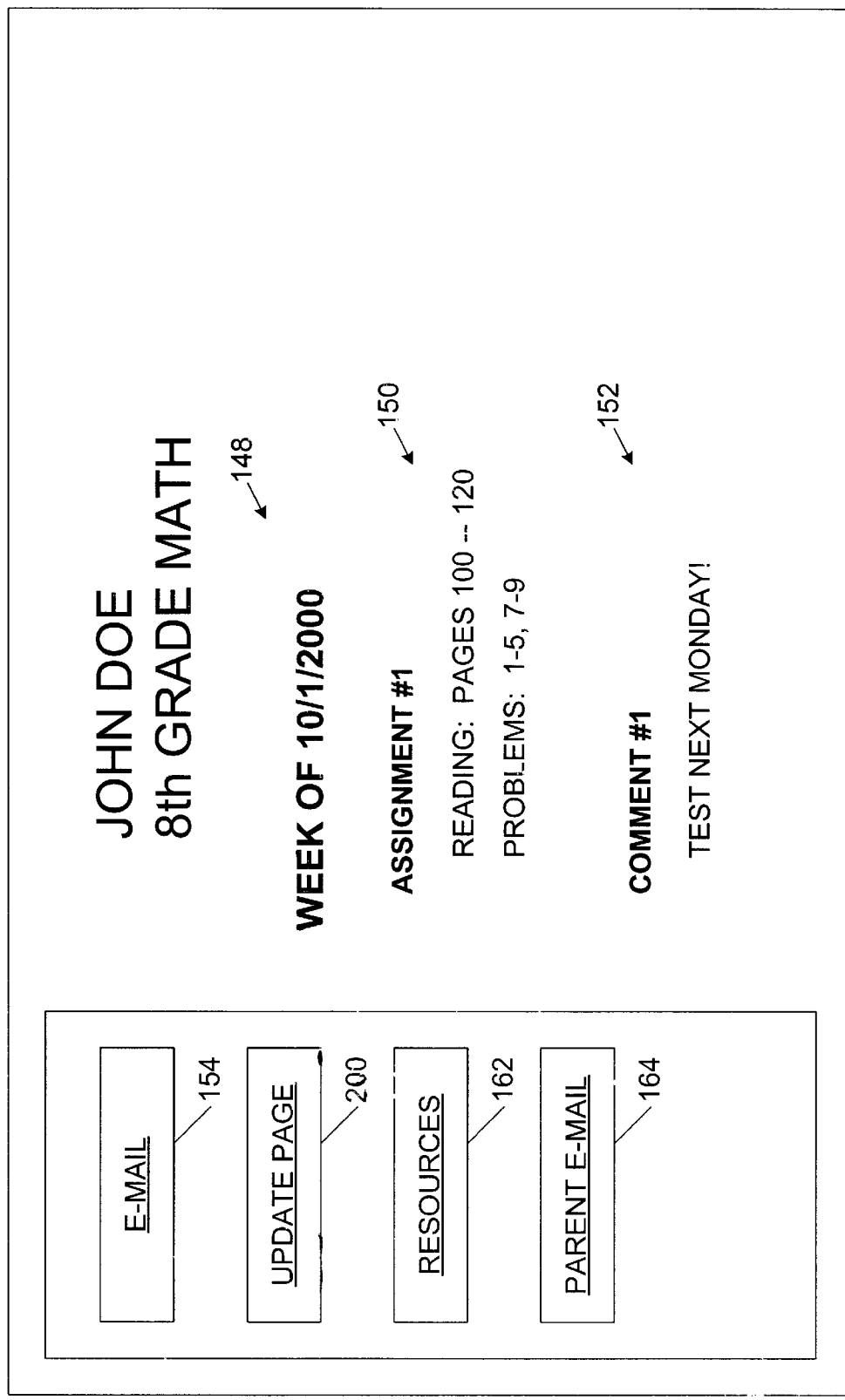
FIG. 11 illustrates an exemplary assignment web page according to the present invention.

When a student, teacher or parent selects one of the assignment links 142, the server system transmits the corresponding assignment web page for display on the user's remote terminal. An exemplary assignment web page 56 is shown in FIG. 11. The assignment page may be in any format desired. In the exemplary embodiment, the assignment web page includes a date indicator 148 to specify the date for which the assignment has been assigned. The assignment web page also includes a first textual portion 150 that specifies the assignment for the corresponding date. A second textual portion 152 includes a comment or message corresponding to the date and/or the assignment. Thus, in the exemplary embodiment, assignment and comments may be placed on a single web page which corresponds to both an assignment link 142 and a comment link 144. Alternatively, the assignment and comment web pages may be separate.

Turning attention back to FIG. 10, teacher web page 54 also includes one or more user-selectable interface links or commands 154. The user-selectable interface commands may include any type of command or link as desired or needed by the particular users. In the exemplary embodiment, interface commands include an e-mail command 156, an add assignments command 158, an add links command 160, a resources command 162, and a parent e-mail command 164.

By selecting e-mail command 156, the user activates an e-mail program configured to send an e-mail message to the corresponding teacher. Typically, the e-mail command sends a control message to the user's remote terminal and Internet browser to activate an e-mail program stored on the remote terminal. The e-mail program may be any of a variety of known e-mail programs including MICROSOFT OUTLOOK, EUDORA, etc. The control message also includes the teacher's e-mail address so that the user need only type the desired communication and select the appropriate e-mail program "transmit" command to transmit the e-mail to the corresponding teacher.

Figure 12:
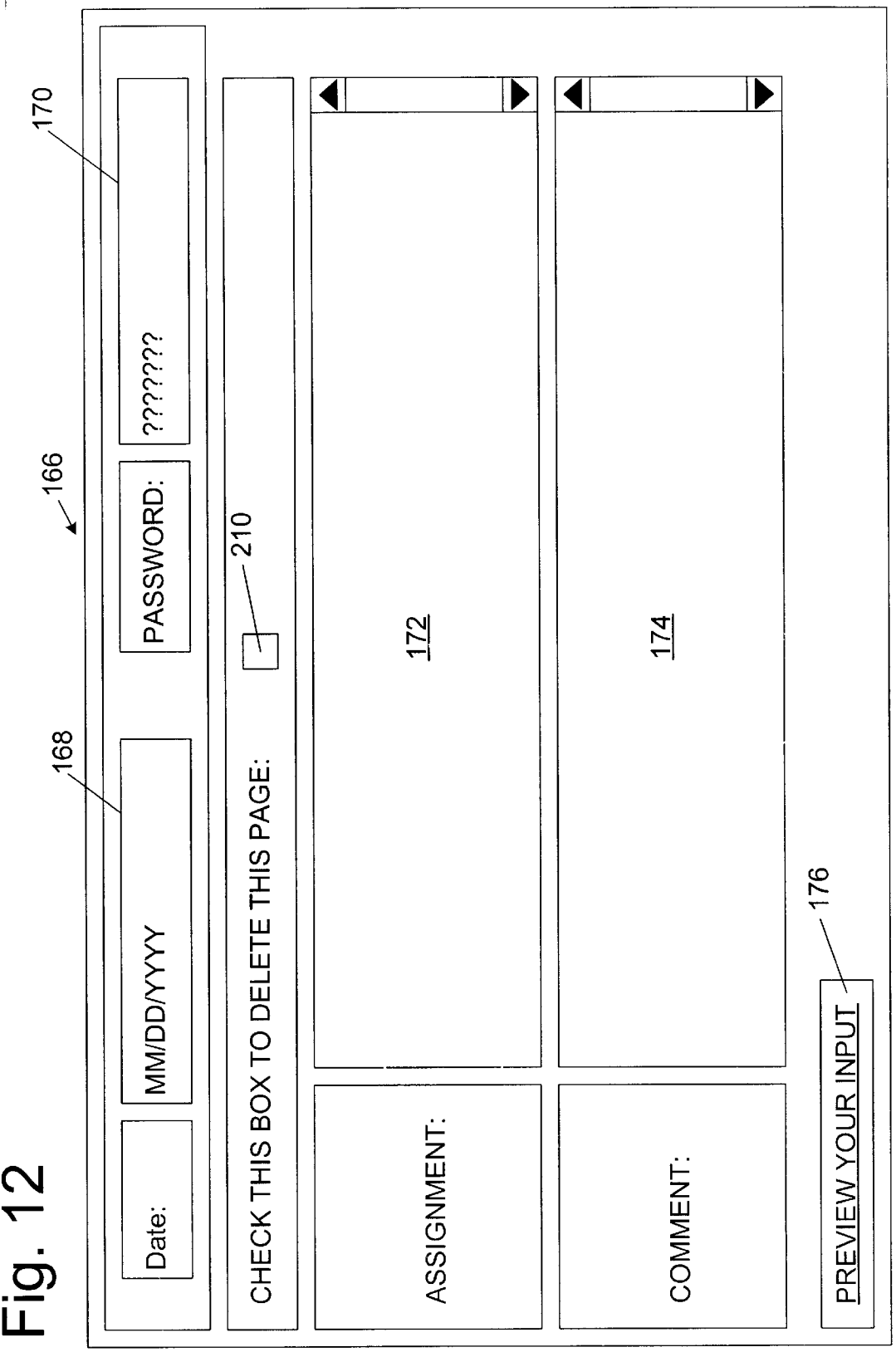
FIG. 12 illustrates an exemplary add assignment web page according to the present invention.

The add assignments command 158 is adapted to engage a portion of the user interface that is accessible only to the corresponding teacher, to allow the teacher to add new assignments to his or her teacher web page 54. When a teacher selects the add assignments command, the server system responds with a request that the teacher enter an authorized password. The server system stores a list of authorized teacher passwords corresponding to individual teacher web pages. If the password received by the server system does not match the corresponding stored password, the user is denied access to the add assignments portion of the teacher interface. If the received password matches the stored password, the server system responds by transmitting an add assignment web page, such as shown generally at 166 in FIG. 12.

Web page 166 allows a teacher to develop or compose an assignment to be added to his or her web page. The web page includes a date entry field 168 in which the teacher may indicate the date of the assignment. The web page also includes a password entry field 170 where the teacher must enter his or her password to authorize the new assignment. The teacher then enters the assignment in the assignment entry field 172. If desired, the teacher may also enter a message or comment in the comment field 174. The teacher may enter the assignments and comments in any format desired.

Once the add assignment web page has been completed, the teacher may select a command or link 176 to see a preview of the new assignment before it is added to the teacher's web page. The server system presents a preliminary assignment web page showing the assignment and/or comments as they will appear on the final assignment/comment web page. If the teacher wishes to change the assignment or comment, the teacher may select a modify command to return to the add assignment web page shown in FIG. 12 to edit the assignment. If the teacher approves the preliminary assignment web page, he or she selects a command (not shown) to add the assignment to the corresponding web page. The server then stores the new assignment on database system 42 and adds the assignment to the teacher's web page by placing a new assignment link 142 on the teacher's web page. The new assignment may be accessed from the teacher's web page by selecting the new assignment link.

Figure 13:
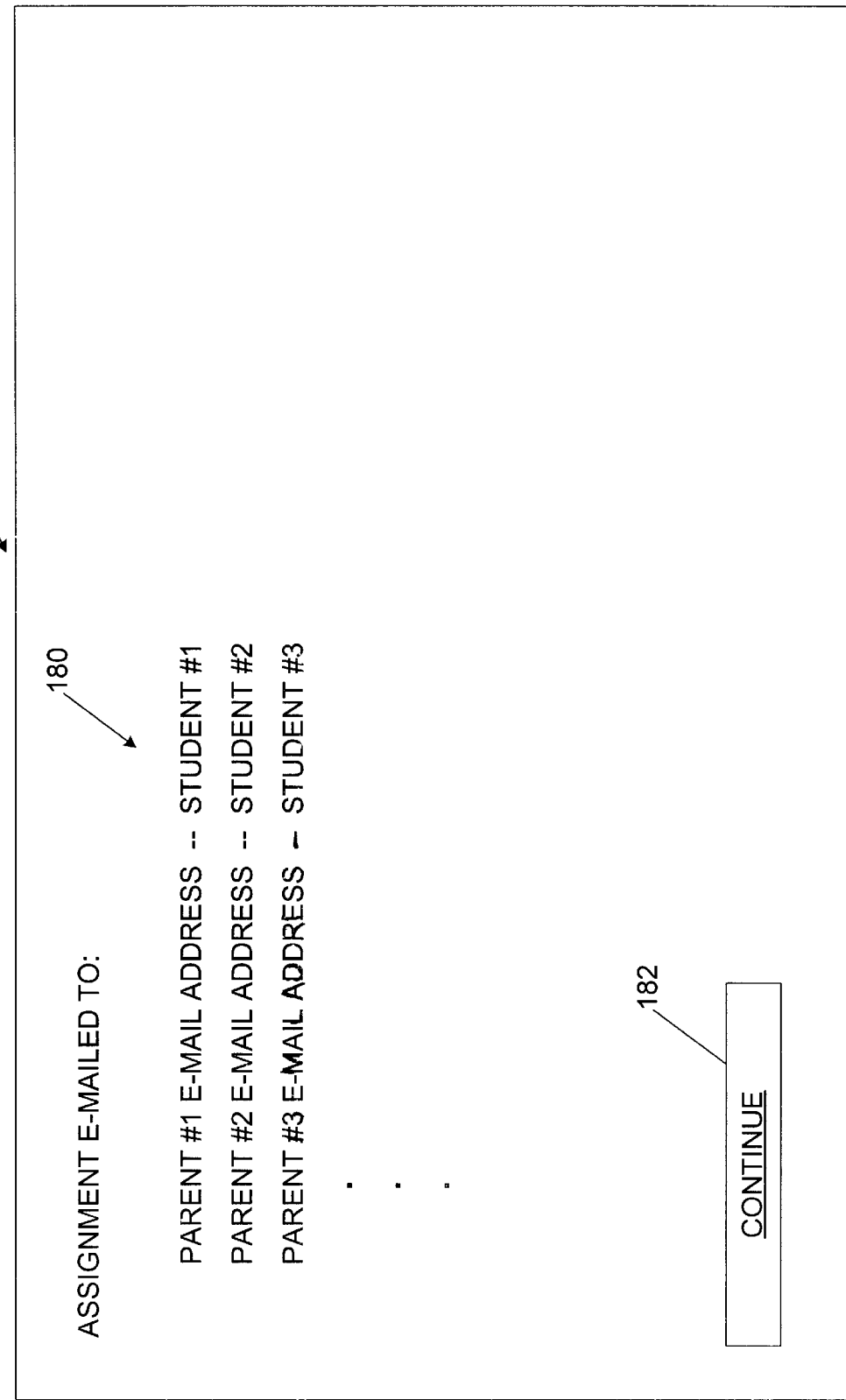
FIG. 13 illustrates an exemplary confirmation web page according to the present invention.

In addition to adding the new assignment to the teacher's web page, the server system software is configured to automatically send the new assignment to those parents (or other users) who requested to receive assignments assigned to the corresponding class of students. Additionally, once the teacher approves the new preliminary assignment web page and selects the command to add the new assignment to his or her web page, the server system responds with a confirmation screen such as indicated generally at 178 in FIG. 13. The confirmation screen includes a list of parents 180 to whom the assignments have been sent. List 180 may also identify each parent's student. Thus, the teacher is informed which students' parents have received the assignment. The teacher may select the continue command 182 to return to the teacher's web page 54. Due to the operation of many Internet browsers, the teacher may need to refresh or reload the image of the teacher web page to see the new assignment.

Figure 14:
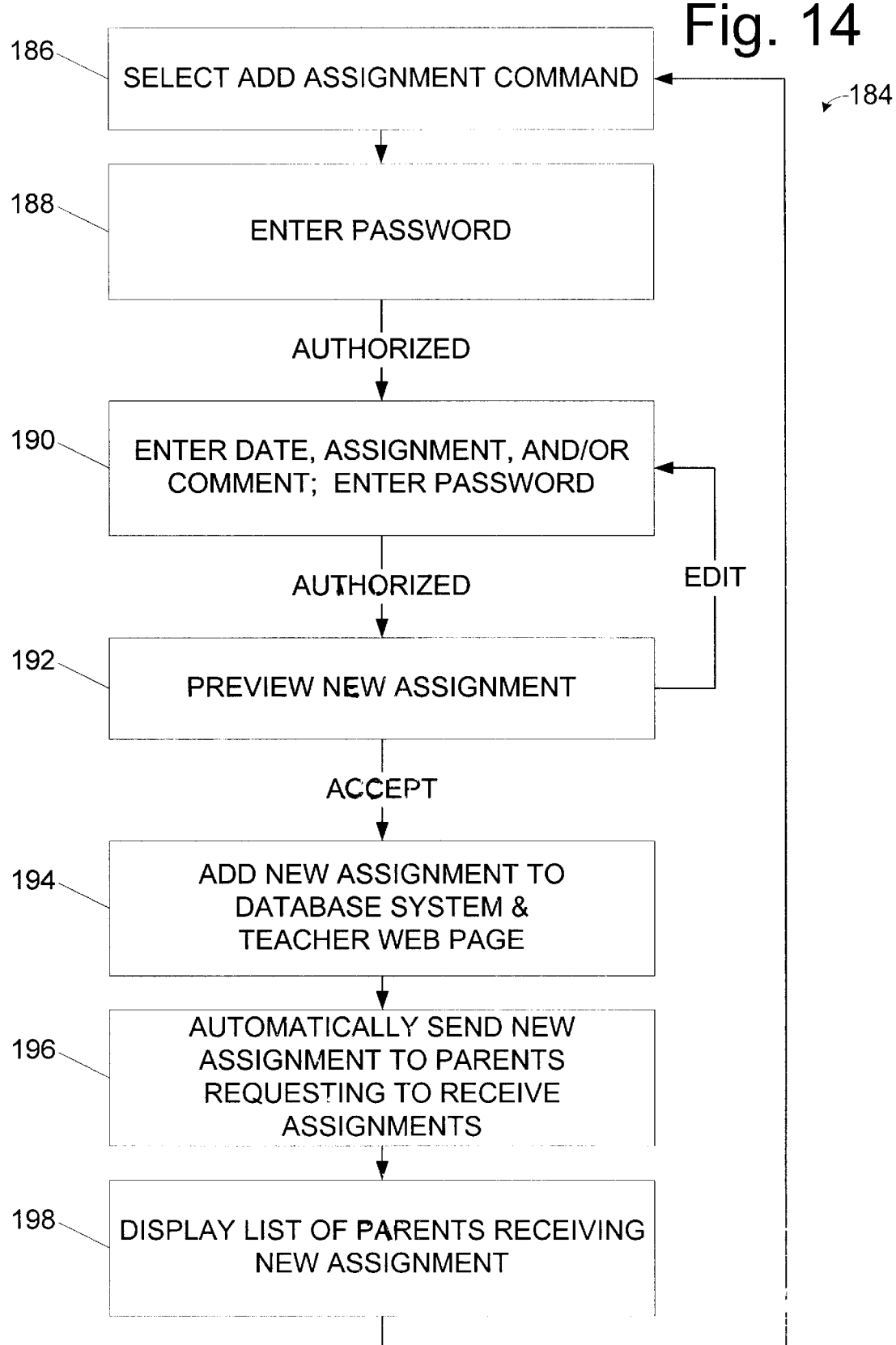
FIG. 14 is a flow chart illustrating a method of allowing a teacher to add an assignment according to the present invention.

An exemplary method by which a teacher may add a new assignment to his or her web page using the teacher interface is illustrated generally at 184 in FIG. 14. From the corresponding teacher web page 54, the teacher selects the add assignment command 158, as indicated at step 186. The teacher then enters his or her password, at step 188. The server system verifies the authorization of the user to add an assignment by determining whether the password matches the teacher's password stored in database system 42. If the password does not match, a suitable error message may be returned. If the password does match, the teacher may enter the new assignment along with a date and comment, as indicated at step 190. The teacher again enters his or her password with the new assignment for additional verification at step 190. Subsequently, at step 192, the teacher previews a preliminary draft of the new assignment as it will appear in an assignment web page. If necessary, the teacher may return to step 190 to edit the new assignment. Otherwise, the teacher accepts the draft assignment and the server system stores the assignment on the database system and adds the assignment to the teacher web page, at step 194. The server system also automatically sends the new assignment to one or more parents requesting to receive the assignment, as indicated at step 196. Finally, at step 198, the server system displays a list of the parents to whom the new assignment was transmitted. The teacher may then add another new assignment if desired.

Figure 15:
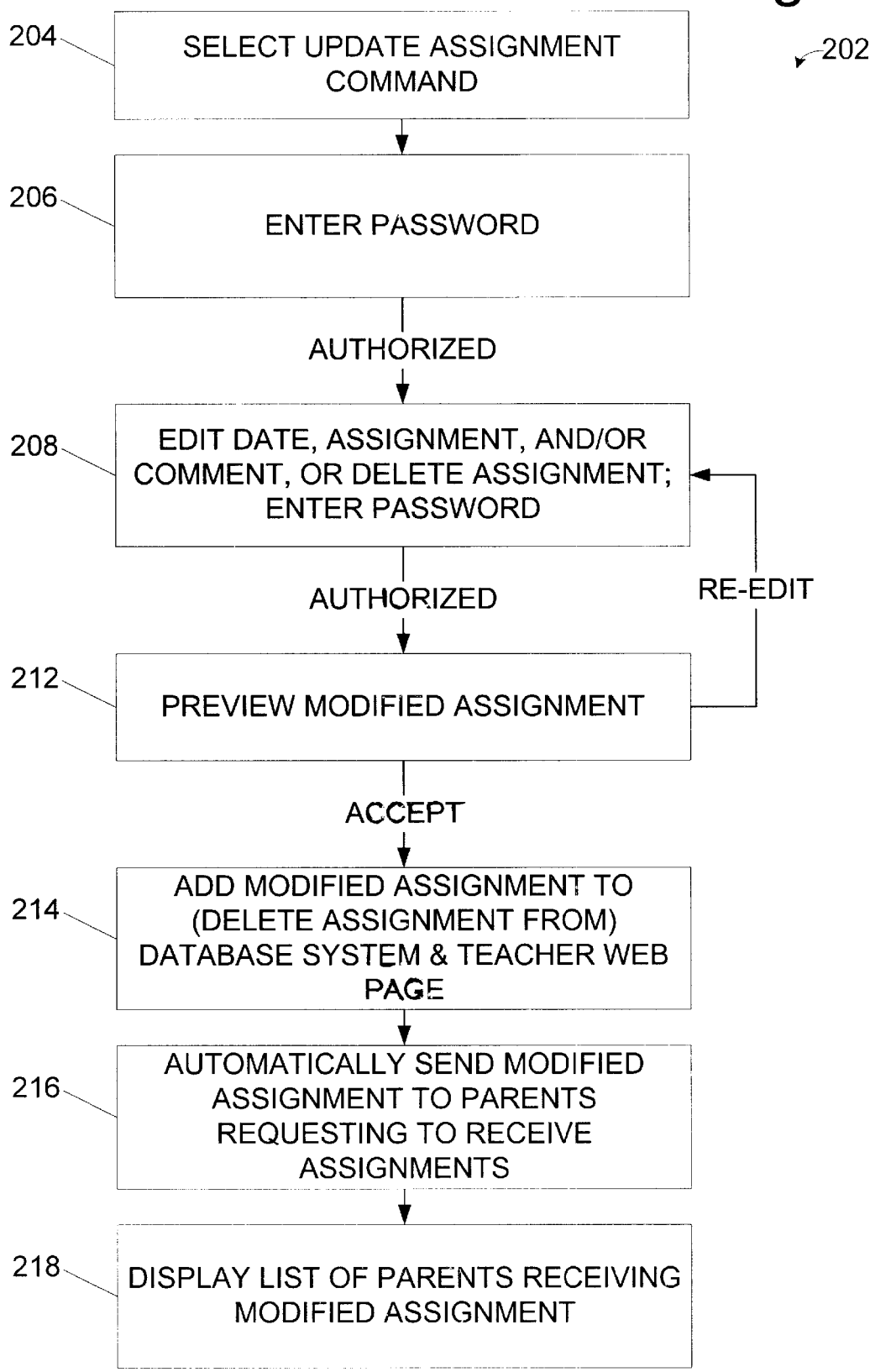
FIG. 15 is a flow chart illustrating a method of allowing a teacher to modify or delete an existing assignment according to the present invention.

In addition to adding a new assignment, the teacher interface also allows a teacher to modify or delete an existing assignment by selecting the update page command or link 200 on the corresponding assignment web page 56. An exemplary method by which a teacher modifies or deletes an assignment is indicated generally at 202, in FIG. 15. After selecting the update page command, as indicated at step 204, the teacher then enters his or her password at step 206. If the password is not authorized, an appropriate error message may be displayed. If the password is authorized, the server system displays an assignment modification web page similar to the add assignment web page shown in FIG. 12. The assignment modification web page includes the date, assignment, and/or comment currently stored for the corresponding assignment web page. Subsequently, at step 208, the teacher may modify the assignment by editing the date, assignment, and/or comment fields 172, 174, and 176, respectively. Alternatively, the teacher may delete the entire assignment by selecting the delete command 210. The teacher then previews the changes, at step 212. If necessary, the teacher may return to step 208 to continue modifying the assignment.

If the teacher accepts the modifications at step 212, the server system replaces the existing assignment stored on database system 42 with the modified assignment, as indicated at step 214. The server system also removes the deleted assignment or adds the modified assignment to the corresponding teacher web page. Next, the server system automatically transmits the modified assignment to those parents who have requested to receive the assignments assigned to the corresponding class of students, as indicated at step 216. The server system may be configured either to transmit or refrain from transmitting a notification that an assignment has been deleted. The server system then displays a list of those parents receiving the modified assignment or notice of a deleted assignment, as indicated at step 218.

Figure 16:
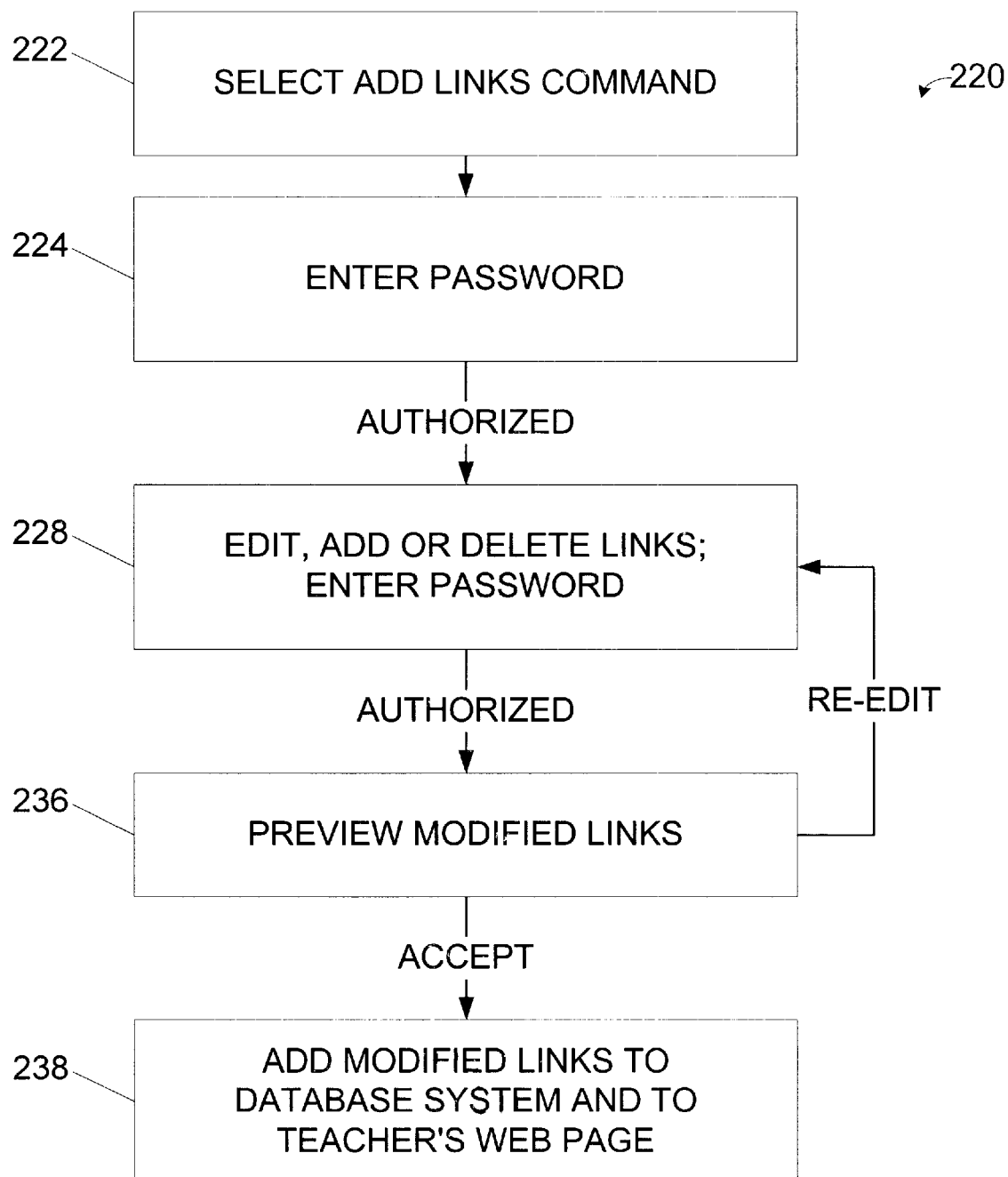
FIG. 16 is a flow chart illustrating a method of allowing a teacher to add a class link according to the present invention.
Figure 17:
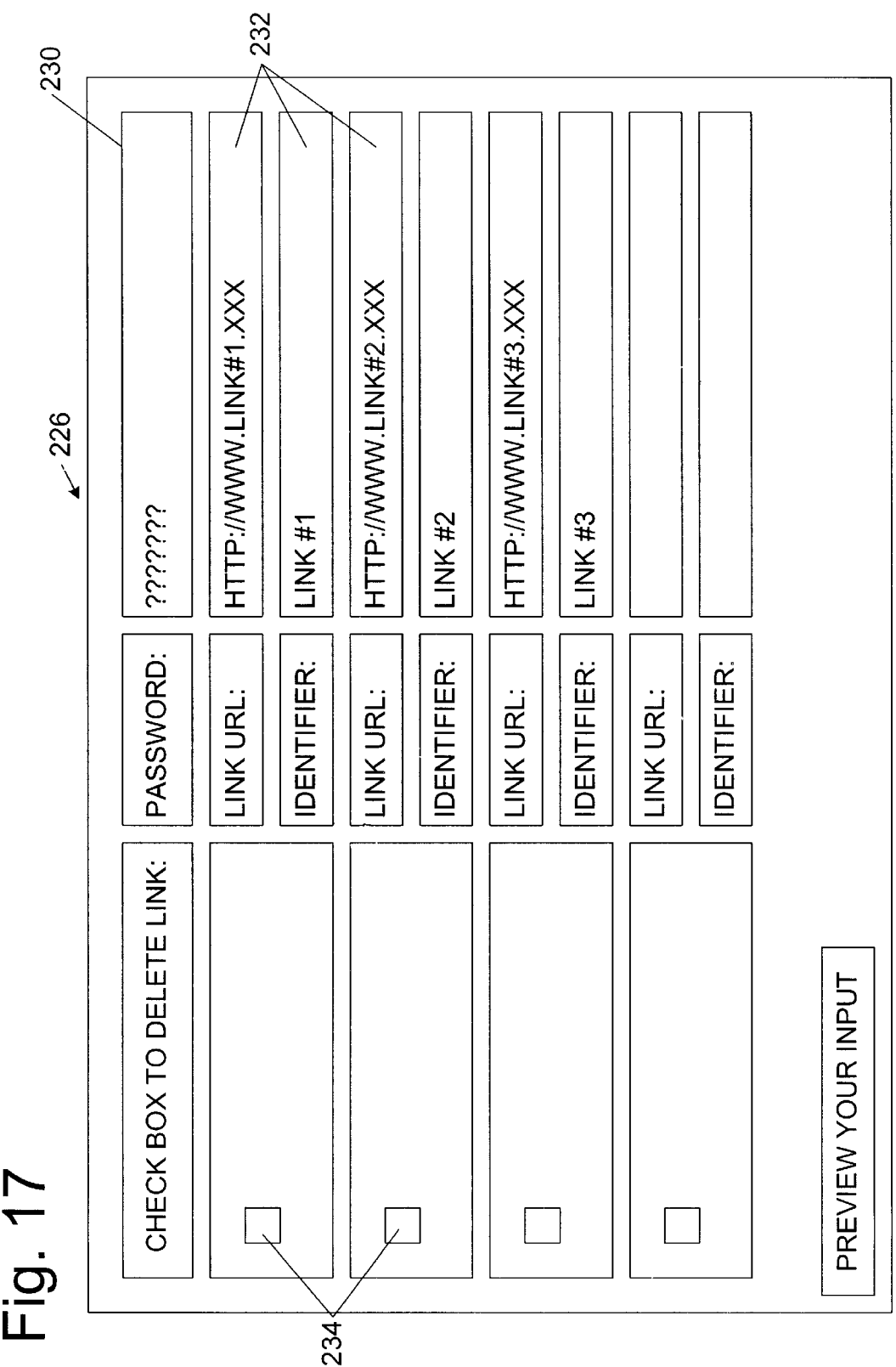
FIG. 17 illustrates an exemplary link modification web page according to the present invention.

Turning attention back to FIG. 10, the add links command 160 may be selected by a teacher to engage a portion of the teacher interface configured to add or modify a class link on the teacher's web page. An exemplary method by which a teacher may add class links is indicated generally at 220 in FIG. 16. From the appropriate teacher web page, the teacher selects the add links command 160, as indicated at step 222, and enters his or her password, at step 224. The server system transmits a class link modification web page as shown at 226 in FIG. 17. The teacher uses the class link modification web page to add, modify or remove class links, as indicated at step 228.

The class link modification web page includes a password field 230 and a plurality of class link fields 232. The teacher must enter his or her password into password field 230. The class link fields identify the class links which currently appear on the teacher's web page, including the network address or URL (uniform resource locator) of the link as well as a textual identifier. The teacher may remove a link from the web page by selecting the appropriate delete command 234. Alternatively, the teacher may modify a link by editing the appropriate class link field. To add a new link, the teacher enters the URL and textual identifier of the link into an empty link field 232. In addition to entering the new links manually, new URL's and textual identifiers may be added using a cut-and-paste method described below.

After completing the class link modification web page, the teacher previews the new or modified class links, as indicated at step 236. If necessary, the teacher may return to step 228 to continue editing the class links. Once the teacher accepts the changes, the server system stores the changes on database system 42 and adds the new or modified links to the teacher's web page, as indicated at step 238.

Returning attention to FIG. 10, the resources command 162 on teacher web page 54 may be selected by a teacher to access various resources available under the teacher interface. In the exemplary embodiment, the teacher may select the resources command to receive a list of those parents requesting to automatically receive assignments, as well as their e-mail addresses. Alternatively, the list may include the e-mail addresses of the parents of all the students' in the class. If desired, the teacher may then send an e-mail message to one or more of the parents. Thus, the teacher is able to communicate with individual parents quickly and confidentially. In addition, the teacher resources may include links to pre-developed lesson plans, tests, reference materials, etc., categorized by subject matter and/or grade level. The teacher resources may also include access to the translation program described above. A tutorial or help program configured to guide teachers in using the virtual school environment and changing their web pages may also be available via the teacher resources command. The teacher resources may also include lists of suggested class links. A teacher may add any of these links to the class links on the teacher's web page by first selecting the desired link, then using the "cut" or "copy" command of the Internet browser to copy the link and finally using the "paste" command to add the link to the list of class links described above. Typically, the teacher will be required to enter their password to access the teacher resources.

Virtual school environment 30 also provides a parent interface configured to receive requests from parents to receive assignments assigned to their children's classes. To access the parent interface, the parent operates remote terminal 36 to display school web page 52, teacher web page 54, or assignment web page 56. From any of these web pages a parent may select the parent e-mail link or command 164. Server system 32 responds by transmitting an e-mail registration form where a parent may enter in their e-mail address and a selected password, which the server system stores on database system 42. Then the server system transmits an assignment subscription web page described below. A parent who has already registered may change their e-mail address or the assignments they wish to receive by selecting the parent e-mail command 164 and entering their e-mail address and password. The server system then verifies their password and, if authorized, presents an assignment subscription web page with their current information.

Figure 18:
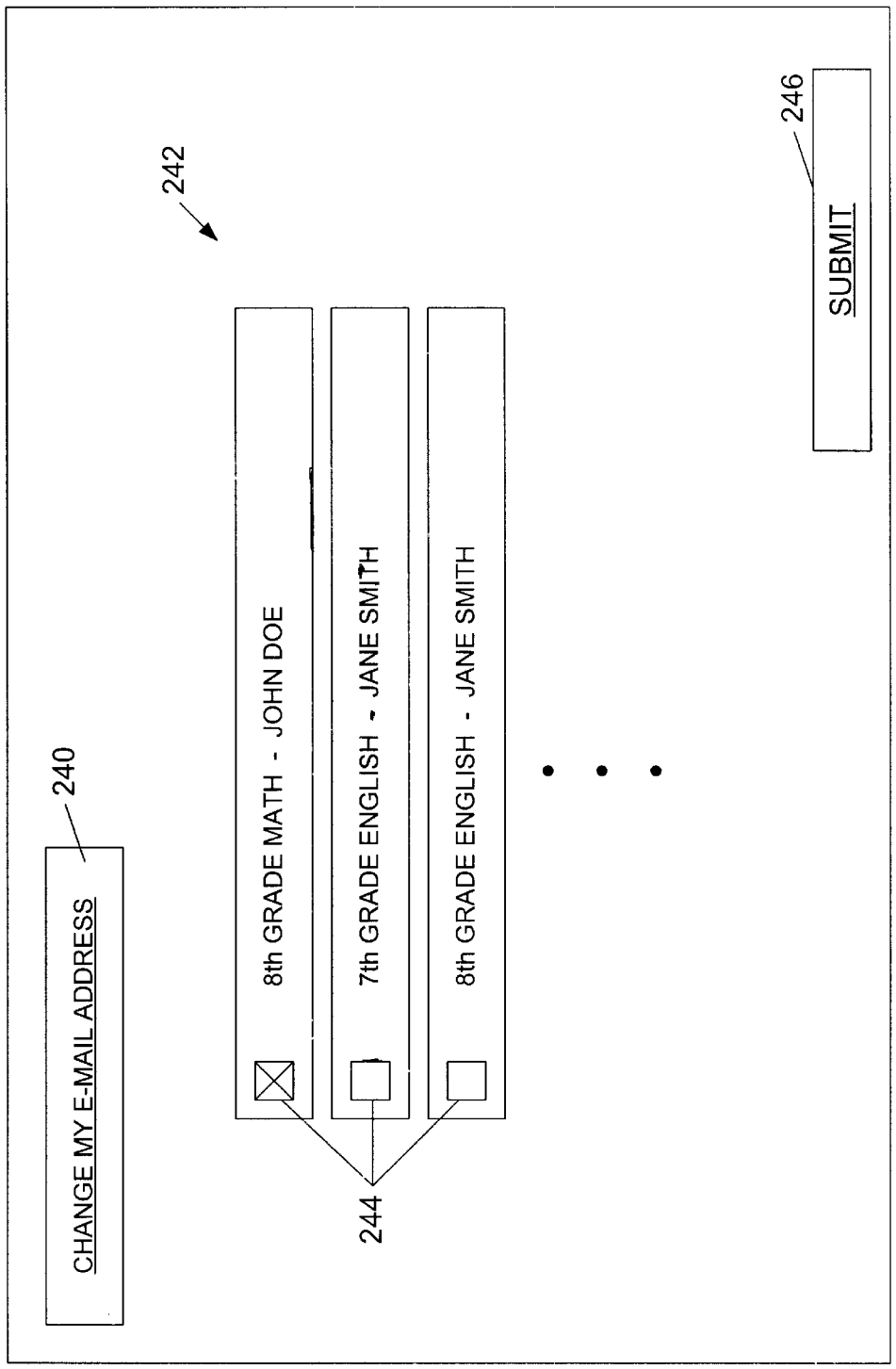
FIG. 18 illustrates an exemplary assignment subscription web page according to the present invention.

FIG. 18 illustrates an exemplary assignment subscription web page. The web page includes a change e-mail address command 240 which allows a parent to change the e-mail address to which assignments are sent. The web page also includes a list 242 of all teacher web pages available on the school web page. The parent may subscribe (or unsubscribe) to the new or modified assignments for a particular class by selecting (or deselecting) the appropriate subscription box 244. Once the parent has made the desired subscriptions, he or she selects a submit command 246 to instruct the server system to store the parent's subscription information in the database server. Thereafter, whenever a teacher adds or modifies an assignment assigned to one of the classes subscribed to by the parent, the server system will automatically transmit the assignment to the parent by e-mail.

As mentioned above, virtual school environment 30 also includes a links & resources command or link 124 and a online courses command or link 126, as shown in FIGS. 7–9. Command 124 provides parent and student users with links to a wide variety of resources depending on the user type. For example, a parent may select command 124 to access parent-focused links and information classified by subject matter and/or grade level. Similarly, a student may select command 124 to access student-focused links and information. In addition, a school administration interface is available through command 124. The administration interface allows a school's administrators to add, delete, or modify the corresponding school web page and add or delete teacher web pages. Once the school administrator enters the appropriate information regarding the teachers and their courses, the server system software is configured to automatically set up new teacher web pages which the teachers can modify.

Online courses command 126 provides access to a further section of environment 30 in which any user may enroll in and take a variety of courses via the Internet. These courses include computer use and programming, business, English, etc. Teachers may offer extra credit for students who complete selected online courses. Additionally, some students may earn credits which may be applied toward graduation or college degrees. The online courses may also include continuing or advanced teacher training courses. It will be appreciated that the online courses may include any type of educational course as desired.

While the invention has been disclosed in its preferred form, the specific embodiments thereof as disclosed and illustrated herein are not to be considered in a limiting sense as numerous variations are possible. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

We claim:

1. A virtual school environment for allowing teachers to communicate with their students or the students' parents over the Internet, comprising:

a database system;

a plurality of school web pages, each corresponding to a different one of plural schools, and a plurality of teacher web pages, each corresponding to a different one of a plurality of teachers from each of the plurality of different schools, and each teacher web page including links to other web pages;

where the plural school web pages and the plural teacher web pages are stored on the database system and linked in a hierarchical arrangement whereby the teacher web pages corresponding to teachers from a particular school may be accessed through links on the school web page corresponding to the particular school;

a computer server system accessible via the Internet and connected to the database system to access the plurality of web pages; and software executable by the computer server system to
develop a list of parents who would like to receive an associated student's school assignments and grades for a class, via the teachers' corresponding web pages;

receive school assignments from one or more teachers via the Internet, add the received assignments to the teachers' corresponding web pages, automatically send the received assignments via electronic mail to the parents on the list who have indicated that they would like to receive a student's school assignments;

receive grades for each student for each assignment, from one or more teachers via the Internet;

add the grades to a portion of the teachers' corresponding web pages that is accessible only by an authorized user; and automatically send the received grades for a student as electronic mail to the parents on the list who have indicated that they would like to receive a student's grades;

transmit a selected teacher's web page containing an assignment or grade via the Internet in response to a request.

2. The virtual school environment of claim 1, wherein the software is executable by the computer server system to add the received assignments to the teacher's corresponding web pages by placing links to the assignments in the web pages.

3. The virtual school environment of claim 1, wherein the software is executable by the computer server system to place links to teacher-selected Internet sites in the teachers' corresponding web pages.

4. The virtual school environment of claim 1, wherein the software is executable by the computer server system to provide a teacher interface to allow teachers to modify their corresponding web pages via the Internet, and wherein the teacher interface includes links to stored lesson plans.

5. The virtual school environment of claim 1, wherein the software is executable by the computer server system to provide a teacher interface to allow teachers to modify their corresponding web pages via the Internet, and wherein the teacher interface includes links to other web pages and a teacher-selectable command to add the links to their corresponding web pages.

6. The virtual school environment of claim 1, wherein each of the received assignments is assigned to at least one class of students, and wherein the software is executable by the computer server system to provide a parent interface configured to receive requests from parents to receive assignments that are assigned to one or more selected classes, and automatically transmit each received assignment as electronic mail to all parents who requested assignments for the corresponding class.

7. The virtual school environment of claim 6, wherein the software is executable by the computer server system to determine, for each received assignment, what class the received assignment is assigned to.

8. The virtual school environment of claim 1, wherein each of the received assignments is assigned to at least one student, and wherein the software is executable by the computer server system to provide a parent interface configured to receive requests from parents to receive assignments that are assigned to one or more students, and automatically transmit each received assignment as electronic mail to the parents who requested assignments for the corresponding student.

9. The virtual school environment of claim 8, wherein the software is executable by the computer server system to determine, for each received assignment, which student the received assignment is assigned to.

10. The virtual school environment of claim 1, wherein the software is executable by the computer server system to provide a student interface including links to online courses.

11. A method for enabling parents to monitor their student's school work, comprising:

for each of one or more classes, developing a list of parents requesting to receive school assignments assigned to the class;

receiving, via a computer network, an assignment from a teacher, wherein the assignment is assigned to a first class;

storing the assignment in a database;

receiving a command from the teacher to assign the assignment to a second class; and automatically transmitting the assignment as electronic mail to each parent on the list for the second class.

12. The method of claim 11, wherein the step of receiving a command includes receiving a command via the computer network.

13. A method for enabling parents to monitor their student's school work, comprising:

receiving, via a computer network, assignments from one or more teachers, wherein each assignment is assigned to one or more classes;

for each of the one or more classes, developing a list of parents requesting to receive school assignments assigned to the class;

for each assignment received, automatically transmitting the assignment as electronic mail to each parent on the list for the corresponding class;

receiving, via the computer network, student grades from one or more teachers;

storing the grades;

receiving requests from students for their grades; and in response to the requests, transmitting the grades to the corresponding students via the computer network.

14. The method of claim 13, further comprising the step of transmitting the grades to the parents of the corresponding students via the computer network.

15. A method for enabling parents to monitor their student's school work, comprising:

receiving, via a computer network, assignments from one or more teachers, wherein each assignment is assigned to one or more classes;

for each of the one or more classes, developing a list of parents requesting to receive school assignments assigned to the class;

for each assignment received, automatically transmitting the assignment as electronic mail to each parent on the list for the corresponding class;

receiving, via the computer network, student grades from one or more teachers;

storing the grades;

receiving requests from parents for their student's grades; and in response to the requests, transmitting the grades to the corresponding parents via the computer network.

16. A virtual school environment, comprising:

a school assignment database system;

a computer server system configured to access the assignment database system, and connectable to a computer network to communicate with parents, teachers, and students; and software executable by the computer server system to develop a list of parents who would like to receive an associated student's school assignments for a class, receive school assignments from one or more teachers via the computer network, wherein each assignment is associated with at least one of plural classes of students, store the assignments in the assignment database system, and automatically transmit the assignments as electronic mail to the parents of one or more of the students in the corresponding classes.

17. The virtual school environment of claim 16, further comprising software executable by the computer server system to receive, via the computer network, modifications to a selected assignment stored in the assignment database system, modify the selected assignment, store the modified assignment in the assignment database system, and automatically transmit the modified assignment as electronic mail to the parents of one or more of the students in the class associated with the modified assignment.

18. The virtual school environment of claim 16, wherein the software is executable by the computer server system to provide a teacher interface including electronic mail addresses of the parents of at least one of the teacher's students.

19. The virtual school environment of claim 18, wherein the teacher interface includes a teacher-selectable command to transmit an electronic mail message to one or more parents.

20. The virtual school environment of claim 16, wherein the software is executable by the computer server system to provide a teacher interface including a list of parents requesting to receive the assignments.

21. The virtual school environment of claim 16, wherein the software is executable by the computer server system to provide a teacher interface including access to stored lesson plans.

22. The virtual school environment of claim 16, wherein the software is executable by the computer server system to provide a student interface including links to online courses.

23. A method for enabling parents to monitor their student's school work, comprising:

developing a list of parents who would like to receive an associated student's assignments and/or grades in a class via email and/or a web page;

storing the list in a database accessible to a computer server system;

receiving, via a web interface to the computer server system, a plurality of assignments from a teacher of the class;

automatically adding the received assignments to a web page for the class served by the computer server system;

automatically transmitting the assignments to the parents on the list who have requested to receive their student's assignments, via a web page and/or email;

for each student, receiving a grade for each assignment at the computer server system; and automatically transmitting a student's grades to the parents on the list who have requested to receive the student's grades, via a web page and/or email.

24. The method of claims 23, further comprising:

developing a list of students in a class who elect to receive their own assignments and grades for the class via email and/or a web page;

automatically transmitting the assignments to the students on the list who have requested to receive the assignments, via a web page and/or email;

for each student, receiving a grade for each assignment; and automatically transmitting the grades to the students who have requested to receive their grades, via a web page and/or email.

25. The method of claim 23, further comprising:

displaying to the teacher a list of parents to whom assignments were sent, via a web page.

26. The method of claim 23, further comprising, adding notices of test dates to a web page for the class.

27. The method of claim 23, further comprising, adding suggested reading lists to a web page for the class.

28. The method of claim 23, further comprising, adding extra credit projects to a web page for the class.

29. The method of claim 23, further comprising, adding class schedules to a web page for the class.

30. The method of claim 23, further comprising, adding holiday reminders to a web page for the class.

* * * * *